(12) United States Patent
Saito

(10) Patent No.: US 8,797,578 B2
(45) Date of Patent: Aug. 5, 2014

(54) PRINTING CONTROL APPARATUS, PRINTING CONTROL METHOD, AND COMPUTER-READABLE STORAGE MEDIUM

(75) Inventor: Kazuyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 13/335,799

(22) Filed: Dec. 22, 2011

(65) Prior Publication Data

US 2012/0176645 A1 Jul. 12, 2012

(30) Foreign Application Priority Data

Jan. 7, 2011 (JP) ................................. 2011-002088

(51) Int. Cl.
*G06F 3/12* (2006.01)
(52) U.S. Cl.
USPC .......................................... 358/1.15; 399/407
(58) Field of Classification Search
None
See application file for complete search history.

(56) References Cited

U.S. PATENT DOCUMENTS

2003/0159114 A1* 8/2003 Nishikawa et al. ............ 715/530
2008/0256541 A1* 10/2008 Rai ................................ 718/101
2010/0238482 A1* 9/2010 Tsukada ....................... 358/1.14

FOREIGN PATENT DOCUMENTS

JP 2010-152822 A 7/2010
JP 2010152822 A * 7/2010

* cited by examiner

*Primary Examiner* — Mark Zimmerman
*Assistant Examiner* — Richa Mishra
(74) *Attorney, Agent, or Firm* — Canon USA, Inc., IP Division

(57) ABSTRACT

A printing control apparatus controls an order of processing executed by a printing apparatus for print jobs included in a first print job group and print jobs included in a second print job group. A detection unit detects a first and second print job included in the first print job group, wherein the second print job has common paper information with the first print job. A control unit arranges processing orders of the detected first and second print jobs to be successive to each other, and arranges a processing order, within the second print job group, of a third print job, which is included in the second print job group and is grouped by a predetermined category together with the first print job, to be equivalent to the processing order of the first print job within the first print job group.

7 Claims, 26 Drawing Sheets

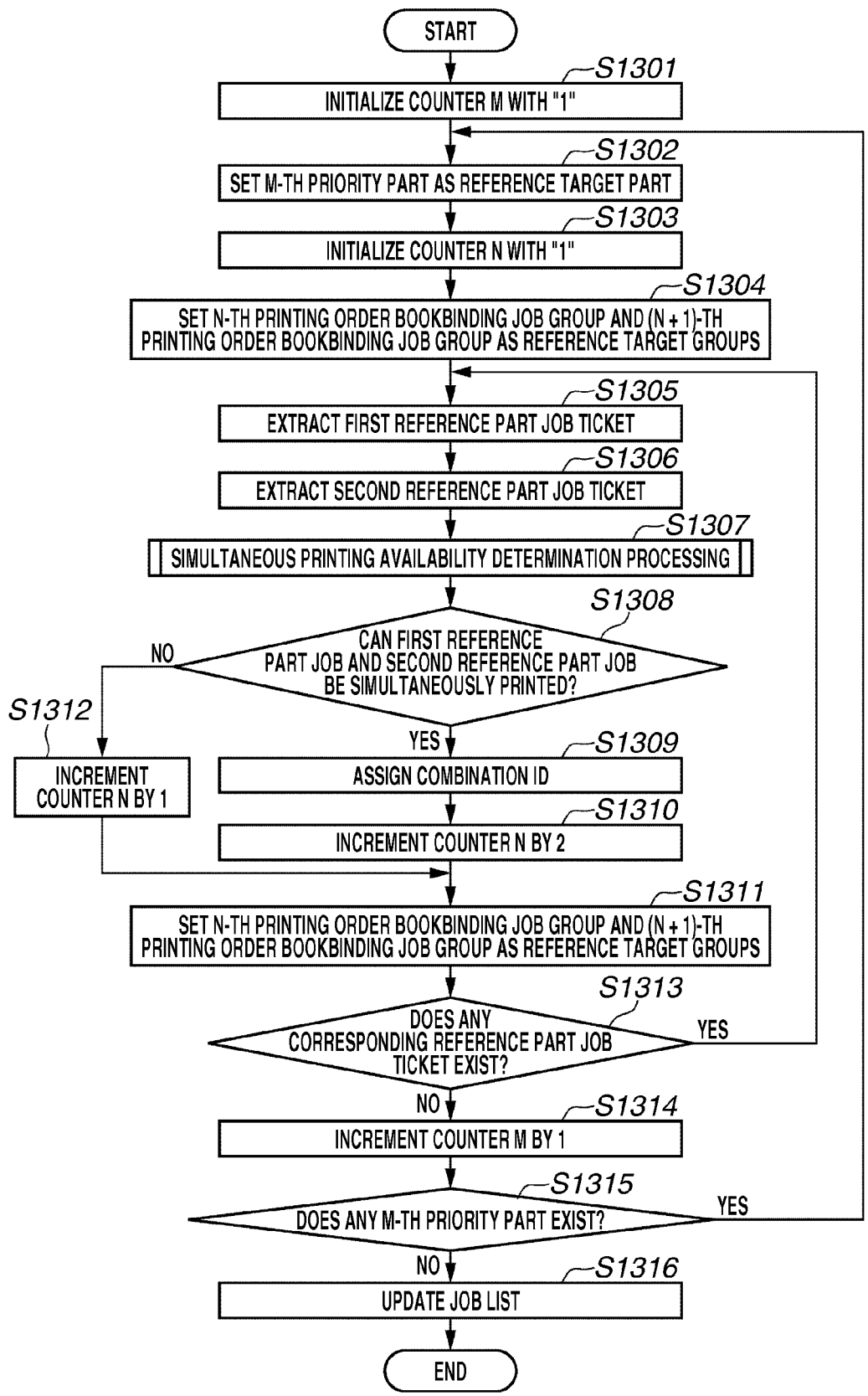

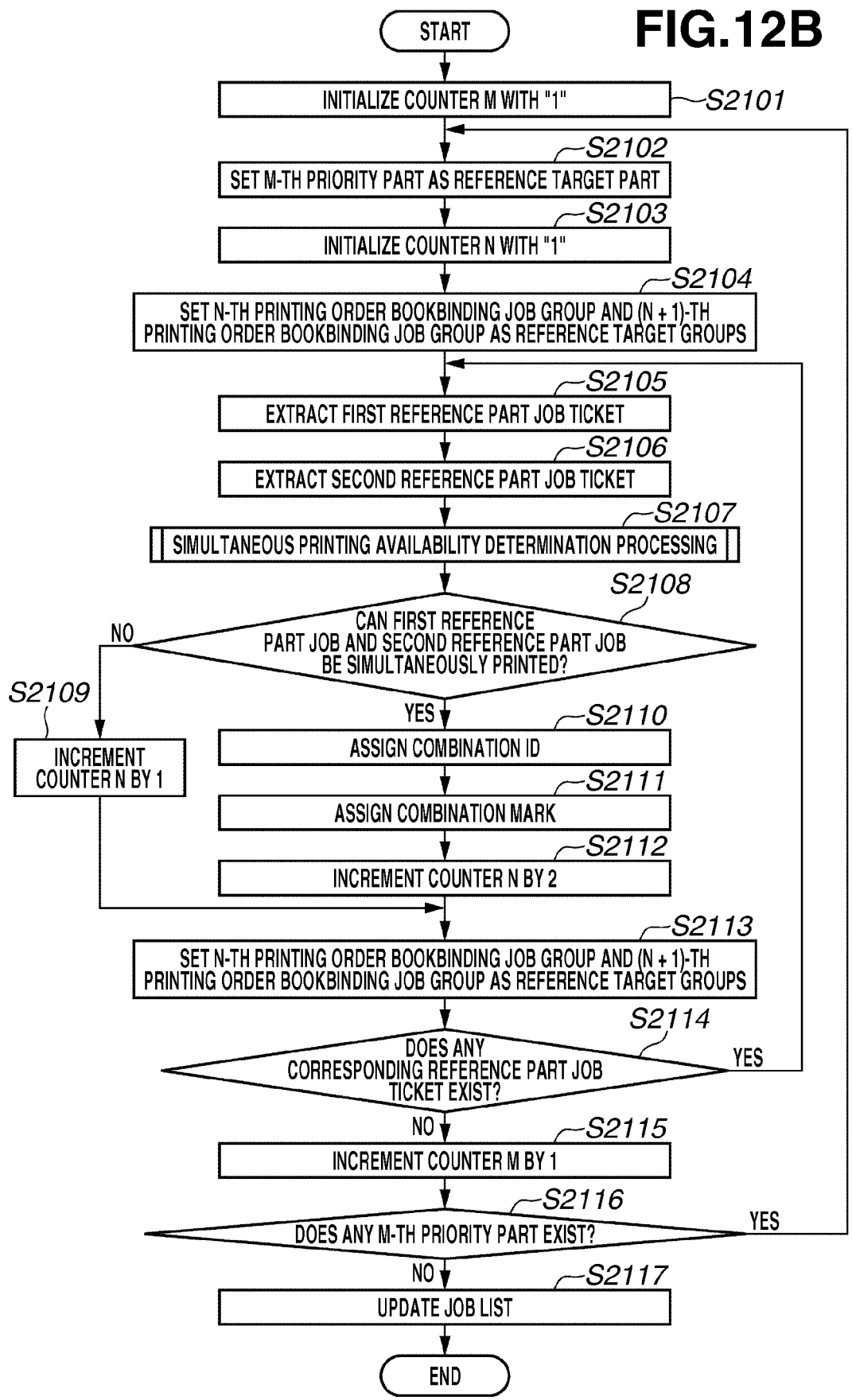

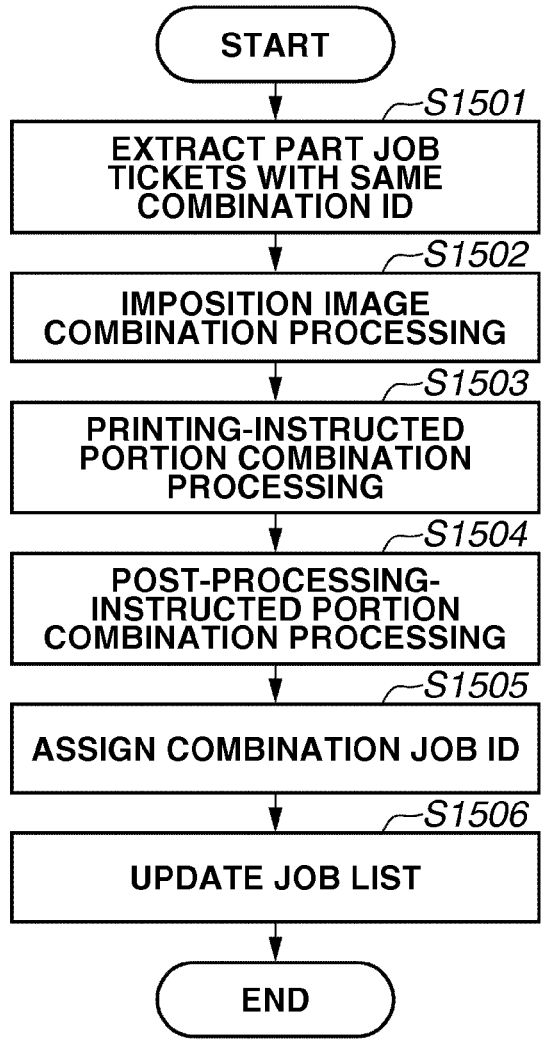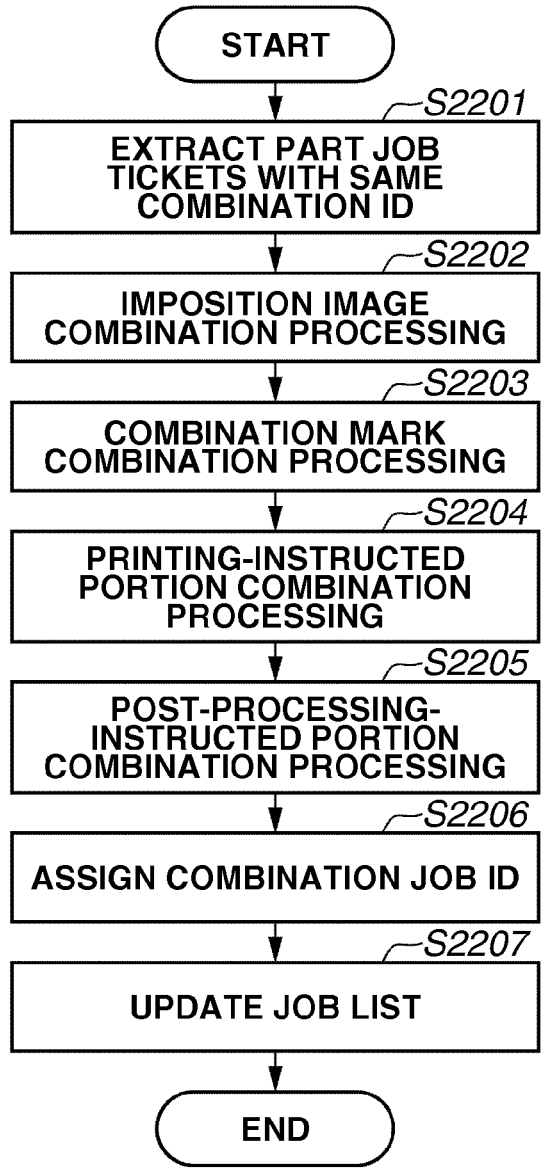

FIG.18

| ORDER ID | ORDER-PLACING CUSTOMER | DISTRIBUTION DESTINATION | NUMBER OF COPIES | WRAPPER BAND | DUST JACKET | COVER | BODY |
|---|---|---|---|---|---|---|---|
| T001 | A | 101 | 1 | PAPER COLOR = BLUE<br>PAPER TYPE = GLOSSY PAPER 1<br>PAPER SIZE = 482×330 | PAPER COLOR = BLUE<br>PAPER TYPE = GLOSSY PAPER 2<br>PAPER SIZE = 482×330 | PAPER COLOR = WHITE<br>PAPER TYPE = THICK PAPER<br>PAPER SIZE = 420×297 | PAPER COLOR = WHITE<br>PAPER TYPE = PLAIN<br>PAPER SIZE = 297×210 |
| | | 102 | 2 | PAPER COLOR = RED<br>PAPER TYPE = GLOSSY PAPER 1<br>PAPER SIZE = 482×330 | PAPER COLOR = WHITE<br>PAPER TYPE = GLOSSY PAPER 2<br>PAPER SIZE = 482×330 | PAPER COLOR = BLUE<br>PAPER TYPE = THICK PAPER<br>PAPER SIZE = 420×297 | PAPER COLOR = BLACK<br>PAPER TYPE = PLAIN<br>PAPER SIZE = 297×210 |
| T002 | B | 201 | 1 | PAPER COLOR = BLUE<br>PAPER TYPE = GLOSSY PAPER 1<br>PAPER SIZE = 482×330 | PAPER COLOR = RED<br>PAPER TYPE = GLOSSY PAPER 2<br>PAPER SIZE = 482×330 | PAPER COLOR = BLUE<br>PAPER TYPE = THICK PAPER<br>PAPER SIZE = 420×297 | PAPER COLOR = BLACK<br>PAPER TYPE = PLAIN<br>PAPER SIZE = 297×210 |
| T003 | C | 301 | 1 | PAPER COLOR = WHITE<br>PAPER TYPE = GLOSSY PAPER 1<br>PAPER SIZE = 482×330 | PAPER COLOR = RED<br>PAPER TYPE = GLOSSY PAPER 2<br>PAPER SIZE = 482×330 | PAPER COLOR = WHITE<br>PAPER TYPE = THICK PAPER<br>PAPER SIZE = 420×297 | PAPER COLOR = BLACK<br>PAPER TYPE = PLAIN<br>PAPER SIZE = 297×210 |
| | | 301 | 1 | PAPER COLOR = RED<br>PAPER TYPE = GLOSSY PAPER 1<br>PAPER SIZE = 482×330 | PAPER COLOR = WHITE<br>PAPER TYPE = GLOSSY PAPER 2<br>PAPER SIZE = 482×330 | PAPER COLOR = BLUE<br>PAPER TYPE = THICK PAPER<br>PAPER SIZE = 420×297 | PAPER COLOR = WHITE<br>PAPER TYPE = PLAIN<br>PAPER SIZE = 297×210 |
| T004 | D | 401 | 1 | PAPER COLOR = BLUE<br>PAPER TYPE = GLOSSY PAPER 1<br>PAPER SIZE = 482×330 | PAPER COLOR = BLUE<br>PAPER TYPE = GLOSSY PAPER 2<br>PAPER SIZE = 482×330 | PAPER COLOR = BLUE<br>PAPER TYPE = THICK PAPER<br>PAPER SIZE = 420×297 | PAPER COLOR = BLACK<br>PAPER TYPE = PLAIN<br>PAPER SIZE = 297×210 |

FIG.19A

| ORDER ID | PRIORITY ORDER | | | NUMBER OF COPIES | PART JOB ID WRAPPER BAND | PART JOB ID DUST JACKET | PART JOB ID COVER | PART JOB ID BODY |
|---|---|---|---|---|---|---|---|---|
| | ORDER-PLACING CUSTOMER | BOOKBINDING JOB GROUP ID | DISTRIBUTION DESTINATION | | | | | |
| T001 | A | | 101 | 1 | P00001 (BLUE) | P00002 (BLUE) | P00003 (WHITE) | P00004 (WHITE) |
| | | | 102 | 2 | P00005 (RED) | P00006 (WHITE) | P00007 (BLUE) | P00008 (BLACK) |
| T002 | B | | 201 | 1 | P00009 (BLUE) | P00010 (RED) | P00011 (BLUE) | P00012 (BLACK) |
| T003 | C | | 301 | 1 | P00013 (WHITE) | P00014 (RED) | P00015 (WHITE) | P00016 (BLACK) |
| | | | 301 | 1 | P00017 (RED) | P00018 (WHITE) | P00019 (WHITE) | P00020 (WHITE) |
| T004 | D | | 401 | 1 | P00021 (BLUE) | P00022 (BLUE) | P00023 (BLUE) | P00024 (BLACK) |

FIG.19B

| ORDER ID | PRIORITY ORDER | | | NUMBER OF COPIES | PART JOB ID WRAPPER BAND | PART JOB ID DUST JACKET | PART JOB ID COVER | PART JOB ID BODY |
|---|---|---|---|---|---|---|---|---|
| | ORDER-PLACING CUSTOMER | BOOKBINDING JOB GROUP ID | DISTRIBUTION DESTINATION | | | | | |
| T001 | A | T001 J01 | 101 | 1 | T001 J01 P1 (BLUE) | T001 J01 P2 (BLUE) | T001 J01 P3 (WHITE) | T001 J01 P4 (WHITE) |
| | | T001 J02 | 102 | 2 | T001 J02 P1 (RED) | T001 J02 P2 (WHITE) | T001 J02 P3 (BLUE) | T001 J02 P4 (BLACK) |
| T002 | B | T002 J01 | 201 | 1 | T002 J01 P1 (BLUE) | T002 J01 P2 (RED) | T002 J01 P3 (BLUE) | T002 J01 P4 (BLACK) |
| T003 | C | T003 J01 | 301 | 1 | T003 J01 P1 (WHITE) | T003 J01 P2 (RED) | T003 J01 P3 (WHITE) | T003 J01 P4 (BLACK) |
| | | T003 J02 | 301 | 1 | T003 J02 P1 (RED) | T003 J02 P2 (WHITE) | T003 J02 P3 (WHITE) | T003 J02 P4 (WHITE) |
| T004 | D | T004 J01 | 401 | 1 | T004 J01 P1 (BLUE) | T004 J01 P2 (BLUE) | T004 J01 P3 (BLUE) | T004 J01 P4 (BLACK) |

FIG.19C

| ORDER ID | ORDER-PLACING CUSTOMER | BOOKBINDING JOB GROUP ID | DISTRIBUTION DESTINATION | NUMBER OF COPIES | PRIORITY ORDER 1 PART JOB ID WRAPPER BAND | 2 PART JOB ID DUST JACKET | 4 PART JOB ID COVER | 3 PART JOB ID BODY |
|---|---|---|---|---|---|---|---|---|
| T001 | A | T001 J01 | 101 | 1 | T001 J01 P1 (BLUE) | T001 J01 P2 (BLUE) | T001 J01 P3 (WHITE) | T001 J01 P4 (WHITE) |
| | | T001 J02 | 102 | 2 | T001 J02 P1 (RED) | T001 J02 P2 (WHITE) | T001 J02 P3 (BLUE) | T001 J02 P4 (BLACK) |
| T002 | B | T002 J01 | 201 | 1 | T002 J01 P1 (BLUE) | T002 J01 P2 (RED) | T002 J01 P3 (BLUE) | T002 J01 P4 (BLACK) |
| T003 | C | T003 J01 | 301 | 1 | T003 J01 P1 (WHITE) | T003 J01 P2 (RED) | T003 J01 P3 (WHITE) | T003 J01 P4 (BLACK) |
| | | T003 J02 | 301 | 1 | T003 J02 P1 (RED) | T003 J02 P2 (WHITE) | T003 J02 P3 (WHITE) | T003 J02 P4 (WHITE) |
| T004 | D | T004 J01 | 401 | 1 | T004 J01 P1 (BLUE) | T004 J01 P2 (BLUE) | T004 J01 P3 (BLUE) | T004 J01 P4 (BLACK) |

FIG.19D

| ORDER ID | ORDER-PLACING CUSTOMER | BOOKBINDING JOB GROUP ID | DISTRIBUTION DESTINATION | NUMBER OF COPIES | PRIORITY ORDER 1 PART JOB ID WRAPPER BAND | 2 PART JOB ID DUST JACKET | 4 PART JOB ID COVER | 3 PART JOB ID BODY |
|---|---|---|---|---|---|---|---|---|
| T001 | A | T001 J01 | 101 | 1 | T001 J01 P1 (BLUE) | T001 J01 P2 (BLUE) | T001 J01 P3 (WHITE) | T001 J01 P4 (WHITE) |
| T004 | D | T004 J01 | 401 | 1 | T004 J01 P1 (BLUE) | T004 J01 P2 (BLUE) | T004 J01 P3 (BLUE) | T004 J01 P4 (BLACK) |
| T002 | B | T002 J01 | 201 | 1 | T002 J01 P1 (BLUE) | T002 J01 P2 (RED) | T002 J01 P3 (BLUE) | T002 J01 P4 (BLACK) |
| T001 | A | T001 J02 | 102 | 2 | T001 J02 P1 (RED) | T001 J02 P2 (WHITE) | T001 J02 P3 (BLUE) | T001 J02 P4 (BLACK) |
| T003 | C | T003 J02 | 301 | 1 | T003 J02 P1 (RED) | T003 J02 P2 (WHITE) | T003 J02 P3 (WHITE) | T003 J02 P4 (WHITE) |
| T003 | C | T003 J01 | 301 | 1 | T003 J01 P1 (WHITE) | T003 J01 P2 (RED) | T003 J01 P3 (WHITE) | T003 J01 P4 (BLACK) |

FIG.19E

| ORDER ID | ORDER-PLACING CUSTOMER | BOOKBINDING JOB GROUP ID | DISTRIBUTION DESTINATION | NUMBER OF COPIES | PRIORITY ORDER 1 PART JOB ID WRAPPER BAND | 2 PART JOB ID DUST JACKET | 4 PART JOB ID COVER | 3 PART JOB ID BODY |
|---|---|---|---|---|---|---|---|---|
| T001 | A | T001 J01 | 101 | 1 | T001 J01 P1 (BLUE) | T001 J01 P2 (BLUE) | T001 J01 P3 (WHITE) | T001 J01 P4 (WHITE) |
| T004 | D | T004 J01 | 401 | 1 | T004 J01 P1 (BLUE) | T004 J01 P2 (BLUE) | T004 J01 P3 (BLUE) | T004 J01 P4 (BLACK) |
| T002 | B | T002 J01 | 201 | 1 | T002 J01 P1 (BLUE) | T002 J01 P2 (RED) | T002 J01 P3 (BLUE) | T002 J01 P4 (BLACK) |
| T003 | C | T003 J01 | 301 | 1 | T003 J01 P1 (WHITE) | T003 J01 P2 (RED) | T003 J01 P3 (WHITE) | T003 J01 P4 (BLACK) |
| T001 | A | T001 J02 | 102 | 2 | T001 J02 P1 (RED) | T001 J02 P2 (WHITE) | T001 J02 P3 (BLUE) | T001 J02 P4 (BLACK) |
| T003 | C | T003 J02 | 301 | 1 | T003 J02 P1 (RED) | T003 J02 P2 (WHITE) | T003 J02 P3 (WHITE) | T003 J02 P4 (WHITE) |

FIG.21A
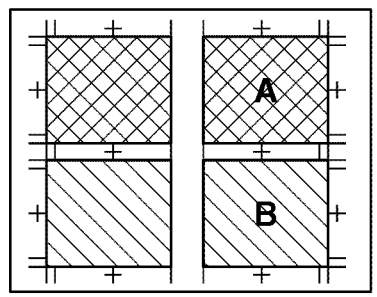
(2901)
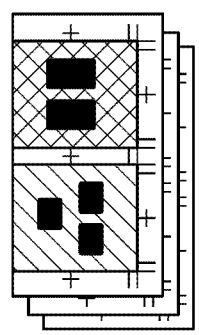
(2902)
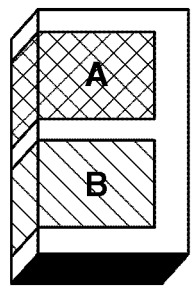
(2903)
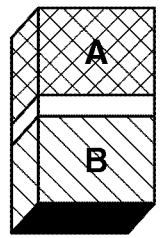
(2904)
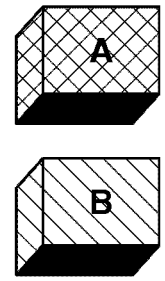
(2905)
FIG.21B
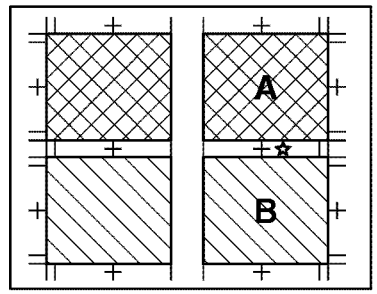
(3401)
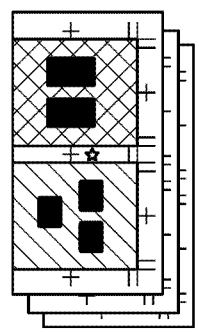
(3402)
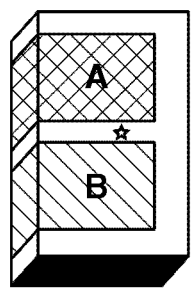
(3403)
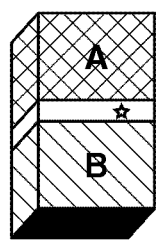
(3404)
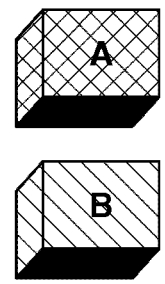
(3405)

FIG.22A

| ORDER ID | ORDER-PLACING CUSTOMER | BOOKBINDING JOB GROUP ID | DISTRIBUTION DESTINATION | NUMBER OF COPIES | COMBINED JOB ID WRAPPER BAND | PRIORITY ORDER 1 | | | ... | 4 | | ... |
|---|---|---|---|---|---|---|---|---|---|---|---|---|
| | | | | | | PART JOB ID WRAPPER BAND | COMBINATION ID | ... | | COMBINED JOB ID COVER | PART JOB ID COVER | COMBINATION ID |
| T001 | A | T001 J01 | 101 | 1 | S001 | T001 J01 P1 (BLUE) | C001 | ... | ... | | T001 J01 P3 (WHITE) | |
| T004 | D | T004 J01 | 401 | 1 | | T004 J01 P1 (BLUE) | C001 | ... | ... | | T004 J01 P3 (BLUE) | C021 |
| T002 | B | T002 J01 | 201 | 1 | | T002 J01 P1 (BLUE) | | ... | ... | S0021 | T002 J01 P3 (BLUE) | C021 |
| T003 | C | T003 J01 | 301 | 1 | | T003 J01 P1 (WHITE) | | ... | ... | | T003 J01 P3 (WHITE) | |
| T001 | A | T001 J02 | 102 | 2 | S002 | T001 J02 P1 (RED) | C002 | ... | ... | | T001 J02 P3 (BLUE) | |
| T003 | C | T003 J02 | 301 | 1 | | T003 J02 P1 (RED) | C002 | ... | ... | | T003 J02 P3 (WHITE) | |

FIG.22B

| ORDER ID | ORDER-PLACING CUSTOMER | DISTRIBUTION DESTINATION GROUP ID | BOOKBINDING JOB GROUP ID | DISTRIBUTION DESTINATION | NUMBER OF COPIES | COMBINED JOB ID WRAPPER BAND | PRIORITY ORDER 1 | | ... | 4 | | ... |
|---|---|---|---|---|---|---|---|---|---|---|---|---|
| | | | | | | | PART JOB ID WRAPPER BAND | COMBINATION ID | ... | COMBINED JOB ID COVER | PART JOB ID COVER | COMBINATION ID |
| T001 | A | D001 | T001 J01 | 101 | 1 | S001 | T001 J01 P1 (BLUE) | C001 | ... | | T001 J01 P3 (WHITE) | |
| T004 | D | D005 | T004 J01 | 401 | 1 | | T004 J01 P1 (BLUE) | C001 | ... | S0021 | T004 J01 P3 (BLUE) | C021 |
| T002 | B | D003 | T002 J01 | 201 | 1 | | T002 J01 P1 (BLUE) | | ... | | T002 J01 P3 (BLUE) | C021 |
| T001 | A | D002 | T001 J02 | 102 | 2 | S002 | T001 J02 P1 (RED) | C002 | ... | | T001 J02 P3 (BLUE) | |
| T003 | C | D004 | T003 J02 | 301 | 1 | | T003 J02 P1 (RED) | C002 | ... | S0022 | T003 J02 P3 (WHITE) | C022 |
| T003 | C | | T003 J01 | 301 | 1 | | T003 J01 P1 (WHITE) | | ... | | T003 J01 P3 (WHITE) | C022 |

FIG.22C

| | PRIORITY ORDER | | | 1 | | | | | ... | 4 | | |
|---|---|---|---|---|---|---|---|---|---|---|---|---|
| ORDER ID | ORDER-PLACING CUSTOMER | BOOKBINDING JOB GROUP ID | DISTRIBUTION DESTINATION | NUMBER OF COPIES | COMBINED JOB ID WRAPPER BAND | COMBINATION MARK | PART JOB ID WRAPPER BAND | COMBINATION ID | ... | COMBINED JOB ID COVER | COMBINATION MARK | PART JOB ID COVER | COMBINATION ID |
| T001 | A | T001 J01 | 101 | 1 | S001 | ★ | T001 J01 P1 (BLUE) | C001 | ... | | | T001 J01 P3 (WHITE) | |
| T004 | D | T004 J01 | 401 | 1 | | | T004 J01 P1 (BLUE) | C001 | ... | S0021 | ☆ | T004 J01 P3 (BLUE) | C021 |
| T002 | B | T002 J01 | 201 | 1 | | | T002 J01 P1 (BLUE) | | ... | | | T002 J01 P3 (BLUE) | C021 |
| T003 | C | T003 J01 | 301 | 1 | | | T003 J01 P1 (WHITE) | | ... | | | T003 J01 P3 (WHITE) | |
| T001 | A | T001 J02 | 102 | 2 | S002 | ◎ | T001 J02 P1 (RED) | C002 | ... | | | T001 J02 P3 (BLUE) | |
| T003 | C | T003 J02 | 301 | 1 | | | T003 J02 P1 (RED) | C002 | ... | | | T003 J02 P3 (WHITE) | |

PRINTING CONTROL APPARATUS, PRINTING CONTROL METHOD, AND COMPUTER-READABLE STORAGE MEDIUM

BACKGROUND OF THE INVENTION

1. Field of the Invention

The present invention relates to a printing control apparatus, a printing control method, and a computer program therefor.

2. Description of the Related Art

In producing a photo book by bookbinding printing, to prevent an operation failure or mistake by an operator, a print job group is formed for each part constituting a photo book, such as the body, the cover, the dust jacket, or the wrapper band, and the printing of the job group is executed by one operation in a specific order. Accordingly, an operator of a printing factory executes bookbinding processing in producing a book product based on printed parts, which are combined in order of printing (for example, in order of the photo books).

More specifically, in the bookbinding processing, the operator extracts the parts constituting each ordered photo book, which is generated based on each printed part, and combines the parts together.

In addition, in executing bookbinding printing of a photo book, various types of paper, which are instructed according to the desire of use of a customer, are used because the printing is executed according to an order from an individual user (customer). Furthermore, in the bookbinding printing like this, the customer may order a print product of various types of finishing by using different types of paper (the color, the thickness, the material, etc.) set for each part even if the same data is input and if the data is to be output in the same format.

Under such circumstances, in generating a plurality of photo books, if very many types of printing paper (sheet) are to be used and if print paper of the type that has not been set to a paper feed cassette of a printing apparatus, it becomes necessary for the operator to replace the print paper.

Japanese Patent Application Laid-Open No. 2010-152822 discusses a method for controlling the printing order (sequence) of print jobs to reduce the operations for replacing the printing paper to be used in a plurality of print jobs using different types of printing paper. In the method discussed in Japanese Patent Application Laid-Open No. 2010-152822, the type of paper to be used in printing of an input print job is determined and the input print job is classified into a print job group for which the printing paper of the determined type is used.

However, in the method discussed in Japanese Patent Application Laid-Open No. 2010-152822, the order of processing a print job that has been registered with a specific job group is determined without considering the order of processing of another print job that has been registered with another job group. In other words, in the conventional method, bookbinding processing for producing a print product that has been printed based on each job group, such as parts of a photo book, is not considered.

If a print job is executed in order of processing determined without considering the bookbinding processing, a plurality of parts constituting a book product may not be processed in an appropriate order within a resulting printed sheet bundle. Accordingly, it may become necessary for the operator to search the printing paper bundle of each part for a necessary part in extracting the part necessary for producing a book product from the printing paper bundle for each part after printing. Therefore, the operation efficiency may degrade.

SUMMARY OF THE INVENTION

The present invention is directed to a printing control apparatus capable of controlling the order of processing of print jobs of one job group based on the processing order of a print job included in another job group and capable of preventing the possible degradation of the operation efficiency, which may occur due to an inappropriate order of processing of print jobs.

According to an aspect of the present invention, a printing control apparatus configured to control an order of processing executed by a printing apparatus for printing a plurality of print jobs, which are included in a first print job group, and a plurality of print jobs, which are included in a second print job group, includes a detection unit configured to detect a first print job included in the first print job group, and a second print job included in the first print job group and having common paper information with the first print job, and a control unit configured to arrange processing orders of the first print job and the second print job detected by the detection unit to be successive to each other, and configured to arrange a processing order, within the second print job group, of a third print job, which is included in the second print job group and is grouped by a predetermined category together with the first print job, to be equivalent to the processing order of the first print job within the first print job group.

According to an exemplary embodiment of the present invention, print jobs are printed in an order of printing determined in conjunction with job groups. Therefore, a print product generated based on the print jobs can be easily produced for each job group.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 12A and 12B are flow charts illustrating an exemplary flow of processing for extracting a combination of part jobs to be simultaneously printed according to each of the second exemplary embodiment and the fourth exemplary embodiment.

FIGS. 14A and 14B are flow charts illustrating an exemplary flow of combined job ticket generation processing according to each of the second exemplary embodiment and the fourth exemplary embodiment.

FIG. 18 illustrates an example of order information.

FIGS. 19A, 19B, 19C, 19D, and 19E illustrate an example of a job list.

FIGS. 21A and 21B illustrate an exemplary book generation process executed when a plurality of jobs is simultaneously printed according to each of the second exemplary embodiment and the fourth exemplary embodiment.

FIGS. 22A, 22B, and 22C illustrate an example of a job list according to each of the second through the third exemplary embodiments.

DESCRIPTION OF THE EMBODIMENTS

Various exemplary embodiments, features, and aspects of the invention will be described in detail below with reference to the drawings.

Figure 1:
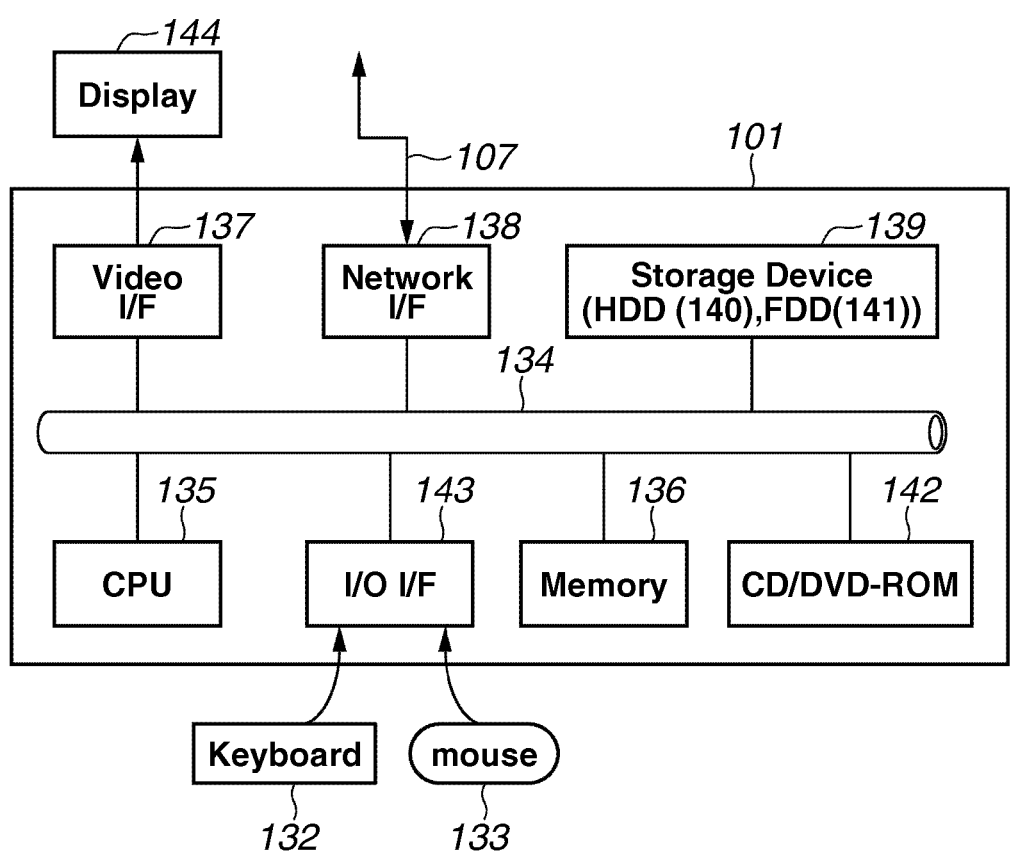
FIG. 1 is a block diagram illustrating an exemplary hardware configuration of a printing control apparatus according to a first exemplary embodiment.

FIG. 1 is a block diagram illustrating an exemplary configuration of hardware (H/W) configured to execute printing control according to a first exemplary embodiment. Input devices, or pointing devices, such as a keyboard 132 and a mouse 133, are connected to a computer module 101 via an input/output (I/O) interface 143. In addition, a display apparatus 144 is connected to the computer module 101.

A network interface (I/F) 138 can connect the computer module 101 with another computer apparatus via a network connection 107. A local area network (LAN) or a wide area network (WAN) can be typically used as the network connection 107.

As a typical configuration of the computer module 101, the computer module 101 includes a central processing unit (CPU) 135 and a memory unit 136. The memory unit 136 is constituted by a random access memory (RAM) or a read-only memory (ROM).

In addition, the computer module 101 includes an I/O interface including a video interface 137. Furthermore, the computer module 101 includes an I/O interface 143, which is an interface for the keyboard 132 and the mouse 133. Moreover, the computer module 101 includes a storage device 139.

The storage device 139 typically includes a hard disk drive (HDD) 140 and a flexible disk drive 141. The storage device 139 can include a medium drive, such as a magnetic tape drive. In addition, the computer module 101 includes a compact disc (CD)/digital versatile disc (DVD)-ROM drive 142. The CD/DVD-ROM drive 142 reads a program and data stored on a CD/DVD-ROM, which is a non-volatile computer-readable storage medium (not illustrated). In addition, the computer module 101 includes a bidirectional connection bus 134. The CPU 135 utilizes the I/O interface 143 in executing a communication via the bidirectional connection bus 134.

The storage device 139 stores a software program that implements processing according to the present exemplary embodiment, which is executed by performing an exemplary flow illustrated in the following flow charts. The processing in the flow charts is implemented by the CPU 135 loading and executing the software program from the storage device 139 on the memory unit 136.

The processing in the following flow charts of the present exemplary embodiment can be implemented by the CPU 135 loading and executing a software program read from a CD/DVD-ROM by using the CD/DVD-ROM drive 142.

Figure 2:
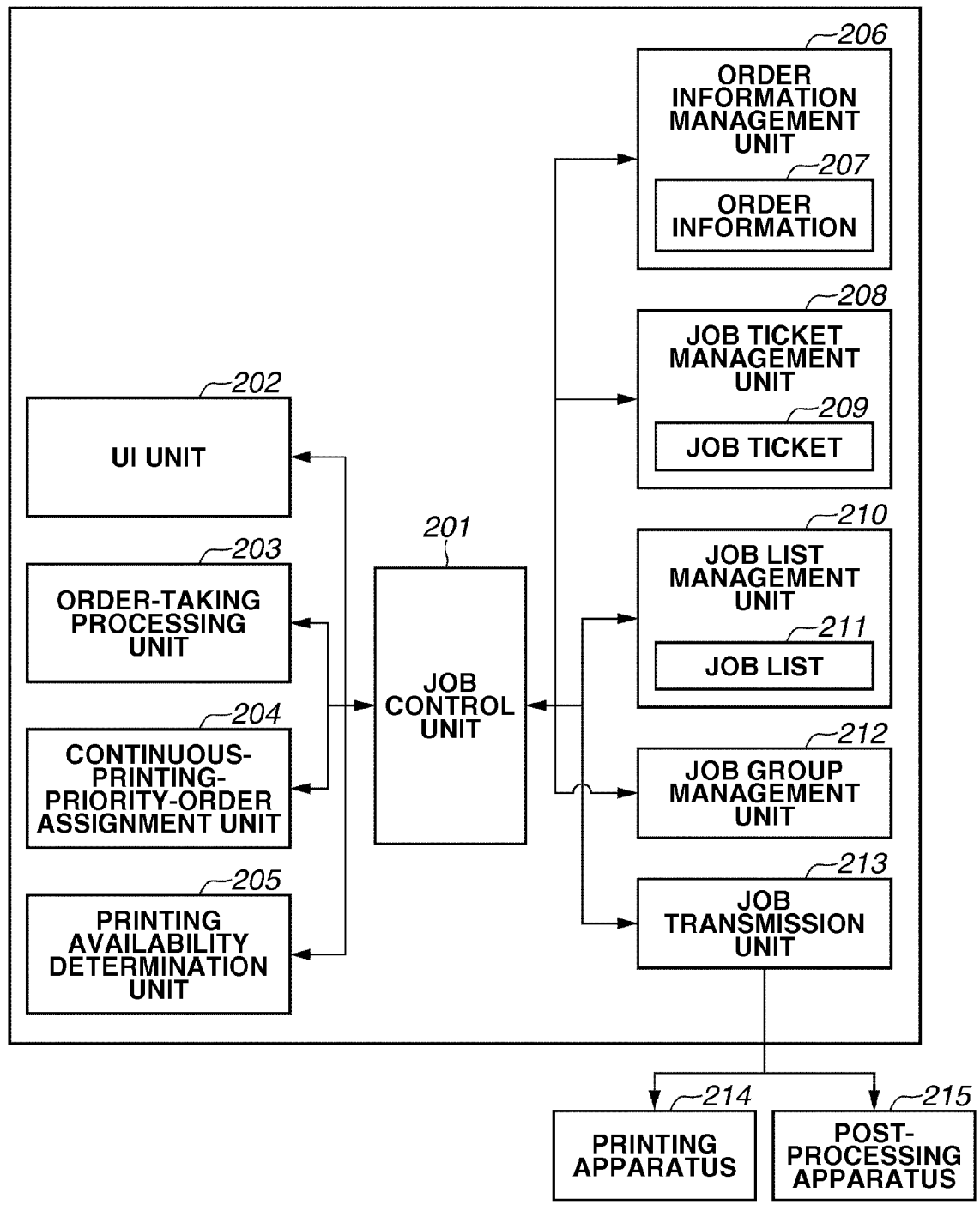
FIG. 2 is a block diagram illustrating an exemplary functional configuration of the printing control apparatus according to the first exemplary embodiment.

FIG. 2 is a block diagram illustrating an exemplary functional configuration of the printing control apparatus according to the present exemplary embodiment. Functions of the printing control apparatus are implemented by the CPU 135 by executing a software program that implements the functions of the printing control apparatus according to the present exemplary embodiment from the storage device 139.

The printing control apparatus includes software module that implements the following processing according to the present exemplary embodiment. In the following description, the computer module 101, which is executed by the CPU 135 by executing the software program, is also referred to as the printing control apparatus 101.

The printing control apparatus 101 includes software modules 202 through 206, 208, 210, 212, and 213, such as a job control unit 201. The job control unit 201 controls processing executed by each software module and the flow of data communicated among the software modules.

A UI unit 202 processes an operator input and an output. An order-taking processing unit 203 processes an input of printing order data. A continuous-printing-priority-order assignment unit 204 assigns a continuous printing priority order to each part.

A printing availability determination unit 205 determines whether continuous printing is available. An order information management unit 206 extracts order information 207 from printing order data. The order information 207 is constituted by information necessary for printing and content data. In addition, the order information management unit 206 manages the order information 207.

A job ticket management unit 208 manages a job ticket 209, which is a printing and binding instruction input to execute printing. A job list management unit 210 manages a job list 211. The job list 211 is a list of the printing order of print jobs, which are constituted by print content data and job tickets. A job group management unit 212 groups print jobs into specific categories and manages the job groups.

Figure 3A:
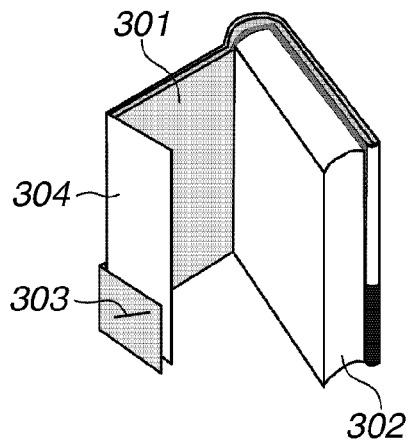
FIGS. 3A and 3B illustrate an exemplary configuration of a photo book and exemplary processing for generating a photo book according to the first exemplary embodiment.
Figure 3B:
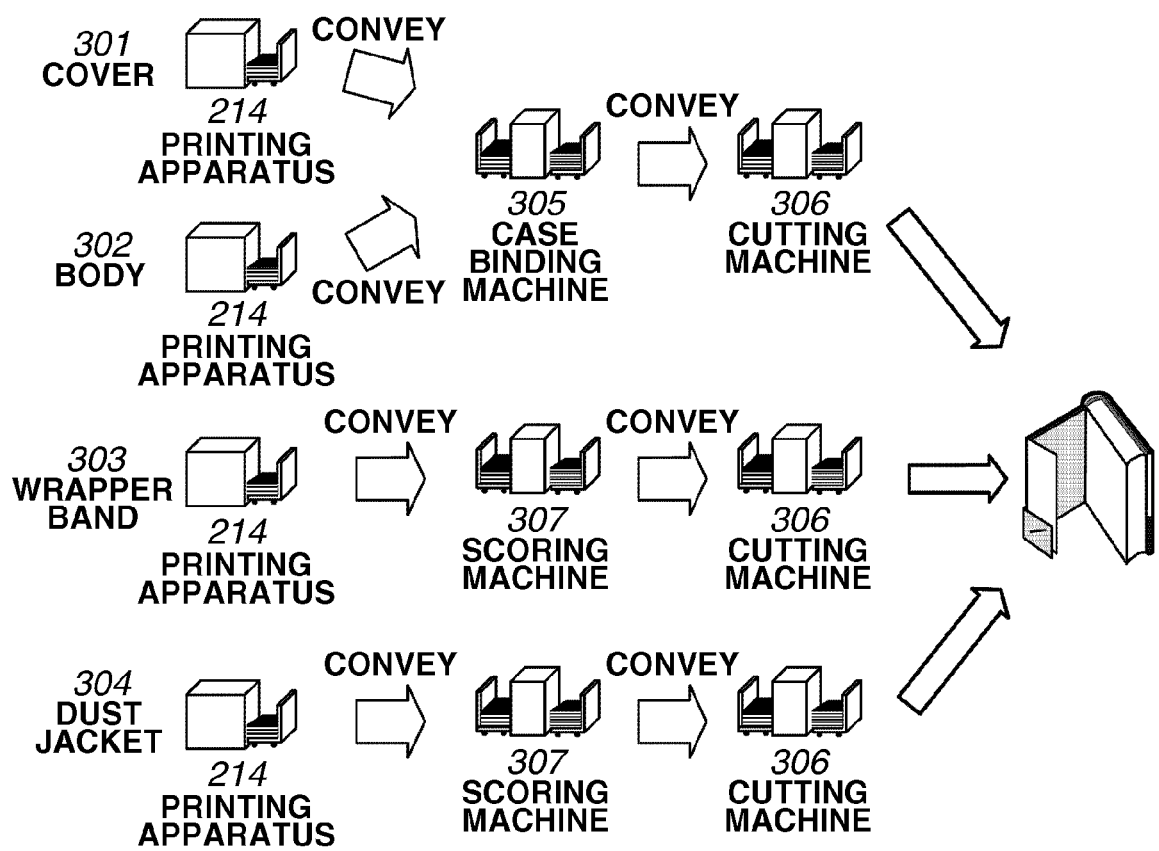

FIGS. 3A and 3B illustrate an exemplary configuration of a photo book and exemplary processing for generating a photo book.

FIG. 3A illustrates an exemplary configuration of a photo book. In the example illustrated in FIG. 3A, four types of parts, such as the cover 301, the body 302, the wrapper band 303, and the dust jacket 304, which are to be combined together, constitute one photo book.

The cover 301 and the body 302 are bound by case binding processing. The bundle of the cover 301 and the body 302 is covered with the dust jacket 304, which is combined thereon. The wrapper band 303 wraps the book over the dust jacket 304.

FIG. 3B illustrates an example of the processing executed by each part in generating a photo book. Each part is printed by a printing apparatus 214. An output product (a printed product) is conveyed to a post-processing apparatus 215 by an operator to be subjected to post-processing.

In the present exemplary embodiment, each of a print product of the cover 301 and a print product of the body 302 is carried by the operator to a case binding machine 305. The case binding machine 305 case-binds the print products together into one book. The case-bound book is cut by a cutting machine 306.

On the other hand, after the wrapper band 303 is printed, the printed wrapper band 303 is scored by a scoring machine 307 and cut by the cutting machine 306. In addition, after the dust jacket 304 is printed, the printed dust jacket 304 is scored by the scoring machine 307 and cut by the cutting machine 306. Subsequently, the products of the parts are combined together into one complete photo book.

As described above, the same print processing is executed by the printing apparatus 214 for the parts. However, the products of processing of the parts are to be subjected to different post-processing. More specifically, the printed and processed products of the parts are to be subjected to post-processing by different number of the post-processing apparatuses 215 and are to be subjected to different types of post-processing executed thereby.

Now, processing by the printing control apparatus 101 according to the present exemplary embodiment will be described in detail below with reference to the following flow charts. Each flow of processing according to the present exemplary embodiment is implemented by the CPU 135, which functions as each software module, by executing a software program from the storage device 139.

The software program is stored on the memory unit 136. Accordingly, the processing in the following flow charts according to the present exemplary embodiment can also be implemented by the CPU 135 by executing the software program.

An exemplary flow of processing from receiving of order information to the transmission of a print job to the printing apparatus 214 will be described in detail below with reference to the flow chart of FIG. 4.

Figure 4:
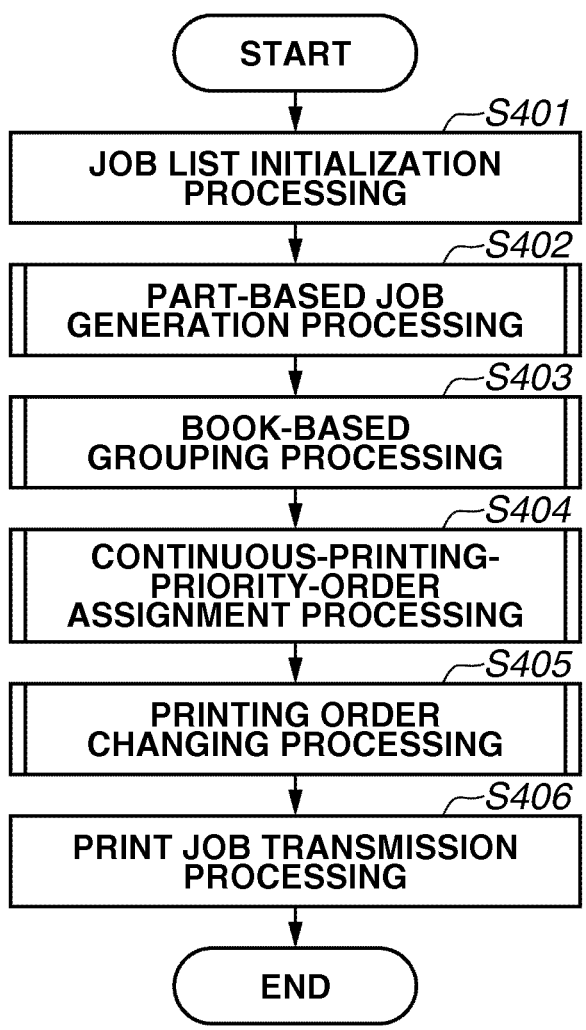
FIG. 4 is a flow chart illustrating an exemplary flow of processing executed by the printing control apparatus according to the first exemplary embodiment.

Each processing in the flow chart of FIG. 4 is implemented by the CPU 135 loading and executing a program for performing processing in each step illustrated in the flow chart of FIG. 4 from the storage device 139 on the memory unit 136.

Referring to FIG. 4, in step S401, the job list management unit 210 reads the order information 207 from the storage device 139 via the order information management unit 206. In addition, in step S401, the job list management unit 210 generates a job list 211 and initializes the generated job list 211. Furthermore, the job list management unit 210 stores the initialized job list the job list 211 on the storage device 139.

In the following description, each processing executed on the job list 211 is executed by the CPU 135 by reading the job list 211 from the storage device 139, and the processed job list 211 is stored on the storage device 139, unless otherwise described. Furthermore, the order information 207 is, for example, information illustrated in FIG. 18. More specifically, the order information 207 is constituted by instruction information and a content to be printed of a photo book, which are received by the order-taking processing unit 203 within a predetermined time period. The order-taking processing unit 203 stores the information and the content included in the order information 207 on the storage device 139.

The job list 211 includes a list of print jobs of a format illustrated in FIGS. 19A, 19B, 19C, 19D, and 19E. In the job lists 211 illustrated in FIGS. 19A through 19E, print jobs (part jobs) for the parts are managed based on an identification (ID) uniquely assigned to each print job.

In step S402, the job ticket management unit 208 reads the order information 207 from the storage device 139 and generates part-based print jobs (part jobs), which are jobs for parts constituting a resulting book. The print jobs are managed on the job list 211 based on part job IDs as illustrated in FIG. 19A. The part job ID will be described in detail below.

A color is described beside the part job ID of each job list 211 illustrated in FIGS. 19A through 19E. The color is a color of the sheet used in each part job generated based on the order information 207 illustrated in FIG. 18. The color of the sheet is described because paper used in printing each part job according to the present exemplary embodiment has the same paper type and the same paper size. The part-based job generation processing in step S402 will be described in detail later below.

In step S403, the job group management unit 212 groups the part jobs into a category with which the part jobs constituting the same book product (photo book) is categorized into the same group. In the present exemplary embodiment, the group including the part jobs grouped into a predetermined category is referred to as a "bookbinding job group". One bookbinding job group is managed on the job list 211 based on a bookbinding job group ID. The bookbinding job group ID will be described in detail later below with reference to FIG. 19B.

One book product corresponds to one bookbinding job group. The book-based grouping processing in step S403 will be described in detail later below.

In step S404, the continuous-printing-priority-order assignment unit 204 assigns a priority order (a continuous printing priority order), which is determined and set with a consideration on printing that continuously uses the same type of paper for each type of part (i.e., continuous printing). As illustrated in FIG. 19C, the same continuous printing priority order is assigned to the part of the same type on the job list 211. The continuous-printing-priority-order assignment processing in step S404 will be described in detail later below with reference to the flow chart of FIG. 6.

In step S405, the printing availability determination unit 205 determines whether print jobs for the same part (for example, the wrapper band) can be continuously printed by printing that uses the common type of paper between different book-binding job group if the order of processing of the print jobs is changed (continuous printing availability determination processing).

In addition, in step S405, the printing availability determination unit 205 changes the order of processing of the print jobs within the part for which the availability of continuous printing has been determined (for example, the wrapper band) to allow the continuous printing that uses the common type of paper.

Furthermore, in step S405, in conjunction with the change of the print job processing order (i.e., the change of the printing order of the part wrapper band), the printing availability determination unit 205 changes the order of printing within each of the other parts (i.e., the dust jacket, the cover, and the body).

The changing of the print job processing order is implemented by rearranging the orders included in the job list 211 from the job list 211 illustrated in FIG. 19C to the job list 211 illustrated in FIG. 19E. The printing order changing processing in step S405 will be described in detail later below with reference to the flow chart of FIG. 7.

In step S406, the job transmission unit 213 outputs a print job for each type of part to the printing apparatus 214, such as a multifunction peripheral (MFP), and the post-processing apparatus 215, such as a binding machine or a cutting machine, according to the processing order in the job list 211.

The part-based job generation processing in step S402, which is processing for generating part jobs, will be described in detail below.

Each type of information described below, such as paper color information and paper size information, is, for example, information illustrated in FIG. 18. The job list 211 illustrated in FIG. 19A is generated based on the information illustrated in FIG. 18.

At the start of the processing in step S402, the order information management unit 206 reads the order information 207 illustrated in FIG. 18 from the storage device 139. Subsequently, the job ticket management unit 208 extracts various types of information and a content, such as paper color information (for example, "blue"), which is designated in the print job of each part, paper type information (for example, "glossy paper 1"), paper size information (for example, "482×330"), and the content to be printed. The above-described information and the content to be printed are extracted from the read order information 207.

Subsequently, the job ticket management unit 208 extracts various types of information necessary for bookbinding processing (bookbinding information), such as the number of pages, a trimming (cutting) position, a scoring position, and a finishing size, from the read order information 207. Furthermore, the job ticket management unit 208 generates a print job ticket for each part (a part job ticket) based on the paper information (the paper color information, the paper type information, and the paper size information) for a print job, the content to be printed, and the bookbinding information, for each extracted part (each print job group).

Subsequently, the job ticket management unit 208 assigns a provisional part job ID (for example, "P00001") to the generated part job ticket. In addition, the job ticket management unit 208 applies the assigned provisional part job ID to the job list 211 (FIG. 19A).

The book-based grouping processing in step S403, which is processing for grouping part jobs into bookbinding job groups, will be described in detail below with reference to the flow chart of FIG. 5 and the job list 211 illustrated in FIG. 19B.

Figure 5:
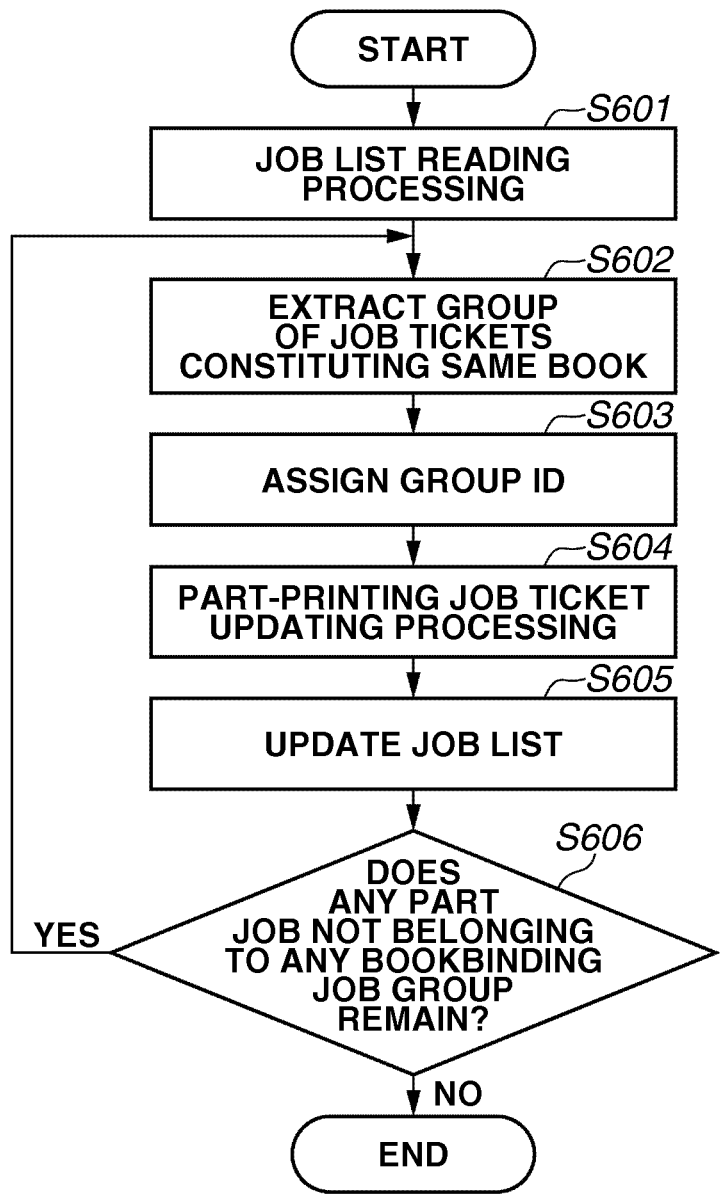
FIG. 5 is a flow chart illustrating an exemplary flow of book-based grouping processing according to the first exemplary embodiment.

The processing in the flow chart of FIG. 5 is implemented by the CPU 135 loading and executing a program for performing processing in each step illustrated in the flow chart of FIG. 5 from the storage device 139 on the memory unit 136.

Referring to FIG. 5, in step S601, the job group management unit 212 reads the job list 211 from the storage device 139. In step S602, the job group management unit 212 extracts a group of parts that constitute the same book (bookbinding job groups) and that have part job IDs of the parts, such as P00001, P00002, P00003, P00004, from part job IDs included in the job list 211.

In step S603, the job group management unit 212 assigns a bookbinding job group ID (for example, a bookbinding job group ID "T001J01" illustrated in FIG. 19B) to the group extracted in step S602. In step S604, the job ticket management unit 208 issues an ID (for example, "T001J01P1"), which is associated with the bookbinding job group ID, to part job tickets belonging to the same bookbinding job group. Furthermore, in step S604, the job ticket management unit 208 updates the part job ID of the part job ticket with the ID.

In step S605, the job list management unit 210 applies the bookbinding job group ID and the part job ID to the job list 211. FIG. 19B illustrates the job list after the IDs are applied. In step S606, the job group management unit 212 determines whether any part job ID not belonging to the bookbinding job group remains.

If it is determined that any part job ID not belonging to the bookbinding job group remains (YES in step S606), then the processing returns to step S602 and the processing insteps S602 through S605 is repeated. On the other hand, if it is determined that no corresponding bookbinding job group remains (NO in step S606), then the book-based grouping processing ends.

Now, the continuous-printing-priority-order assignment processing in step S404, which is processing for assigning a continuous printing priority order to each type of part, will be described in detail later below with reference to the flow chart of FIG. 6, the example of order information illustrated in FIG. 18, and the job list illustrated in FIG. 19B.

Figure 6:
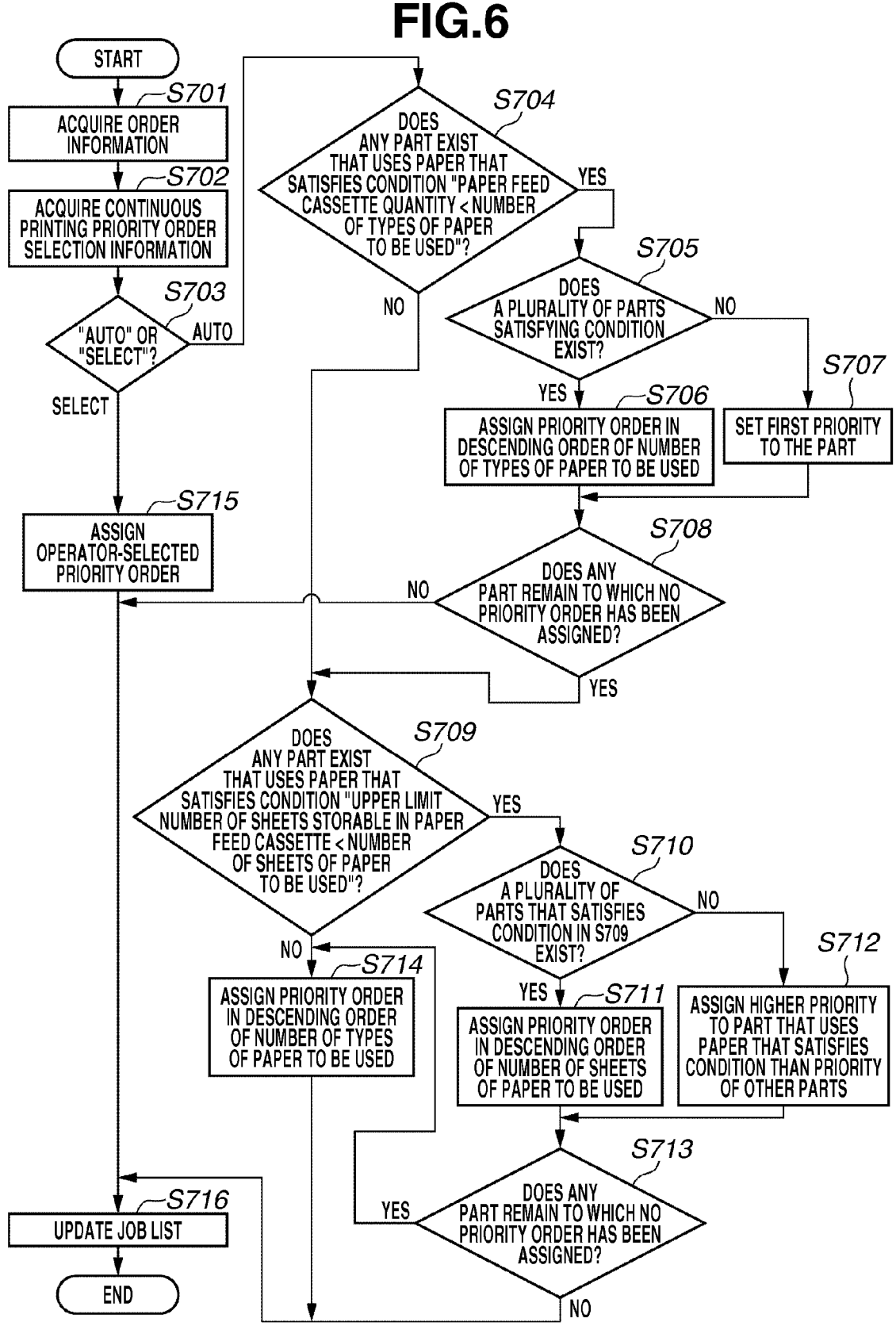
FIG. 6 is a flow chart illustrating an exemplary flow of continuous-printing-priority-order assignment processing according to the first exemplary embodiment.

Each processing in the flow chart of FIG. 6 is implemented by the CPU 135 loading and executing a program for performing processing in each step illustrated in the flowchart of FIG. 6 from the storage device 139 on the memory unit 136.

Referring to FIG. 6, in step S701, the order information management unit 206 reads and acquires the order information 207 from the storage device 139. In step S702, the continuous-printing-priority-order assignment unit 204 reads operator-selected information from the storage device 139 and acquires information about the continuous printing priority order.

Figure 20:
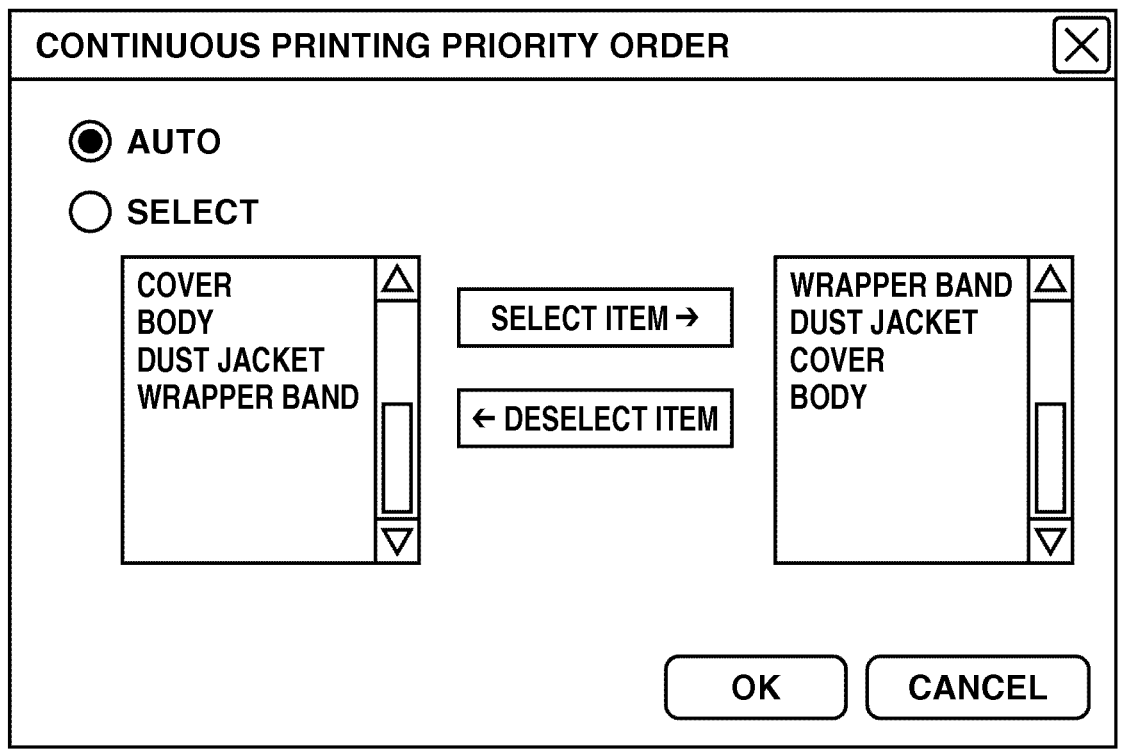
FIG. 20 illustrates an example of a user interface (UI) for assigning a continuous printing priority order.

In the present exemplary embodiment, it is supposed that the UI unit 202 receives an input of information about the continuous printing priority order for each type of part selected by the operator and the received information has been registered on the storage device 139. The input of the information is implemented by displaying a screen illustrated in FIG. 20 on the UI unit 202.

In step S703, the continuous-printing-priority-order assignment unit 204 determines which of "auto" and "select" has been set in the information about the continuous printing priority order. If it is determined that "auto" has been set in the information about the continuous printing priority order ("AUTO" in step S703), then the continuous-printing-priority-order assignment unit 204 refers to the part job ticket for each part (in FIG. 19B, "wrapper band", "dust jacket", "cover", and "body") and compares the number of types of paper to be used and the number of paper feed cassettes provided to the printing apparatus 214.

In step S704, the continuous-printing-priority-order assignment unit 204 determines whether any part exists for which the number of paper feed cassettes is smaller than the number of types of paper to be used. The comparison in step S704 is executed to determine a part for which the paper feed cassette is to be replaced to change the paper type. In the present exemplary embodiment, two paper feed cassettes are used.

If it is determined that no part exists for which the number of paper feed cassettes is smaller than the number of types of paper to be used (NO in step S704), then the processing advances to step S709. On the other hand, if it is determined that a part exists for which the number of paper feed cassettes is smaller than the number of types of paper to be used (YES in step S704), then the processing advances to step S705. In step S705, the continuous-printing-priority-order assignment unit 204 determines whether a plurality of corresponding parts exists. In the present exemplary embodiment, a plurality of corresponding parts ("wrapper band" and "dust jacket") exists.

If it is determined that a plurality of corresponding parts exists (YES in step S705), then the processing advances to step S706. In step S706, the continuous-printing-priority-order assignment unit 204 assigns priority orders in descending order of the number of types of paper to be used exclusively for the same part. More specifically, the priority order assigned to the part describes the frequency of replacement of paper feed cassettes.

As described above, based on the priority order assigned to the part, the printing order in which the paper feed cassette needs to be replaced least frequently is determined by printing order changing processing, which will be described in detail later below (determination processing).

In determining the priority order among parts of the same available number of types of paper, for the part jobs whose number of types of paper to be used is the same, the continuous-printing-priority-order assignment unit 204 assigns a higher priority order in ascending order of part job IDs within the same bookbinding job group. In the example illustrated in FIG. 19B, the continuous-printing-priority-order assignment unit 204 assigns the priority orders of "1" and 2" " to "wrapper band" and "dust jacket", respectively, whose number of types of paper to be used is "3", based on the order information illustrated in FIG. 18.

On the other hand, if it is determined that only one corresponding part exists (NO in step S705), then the processing advances to step S707. In step S707, the continuous-printing-priority-order assignment unit 204 adds the priority order "1" to the part and sets the part as a first-priority part.

In step S708, the continuous-printing-priority-order assignment unit 204 determines whether any part remains to which no priority order has been assigned. If it is determined that apart remains to which no priority order has been assigned (YES in step S708), then the processing advances to step S709. On the other hand, if it is determined that no such part remains to which no priority order has been assigned (NO in step S708), then the processing advances to step S716.

In the present exemplary embodiment, it is supposed that the priority order has not been assigned to "dust jacket" and "body" yet. Then the processing advances to step S709. In step S709, the continuous-printing-priority-order assignment unit 204 compares the number of sheets of paper to be used and the upper limit number of sheets storable in the paper feed cassette.

In executing the comparison, the continuous-printing-priority-order assignment unit 204 determines whether any part exists for which the upper limit number of sheets storable in the paper feed cassette is smaller than the number of sheets of paper to be used. The comparison is executed to determine whether it is necessary to replace the paper feed cassette in replenishing the paper to the paper feed cassette for each part.

In the present exemplary embodiment, it is supposed that the upper limit number of sheets storable in the paper feed cassette is the same for both paper feed cassettes. In addition, the number of sheets of paper to be used includes the maximum number of sheets among the number of sheets calculated for each type of paper to be used within the part type.

In the example illustrated in FIG. 19B, for the part "body", the number of sheets of paper to be used with an attribute "sheet color=black" has exceeded the upper limit number of sheets storable in the paper feed cassette.

If it is determined that any part exists that uses the paper for which any part exists for which the upper limit number of sheets storable in the paper feed cassette is smaller than the number of sheets of paper to be used (YES in step S709), then the processing advances to step S710. In step S710, the continuous-printing-priority-order assignment unit 204 determines whether a plurality of corresponding parts exists.

If it is determined that a plurality of corresponding parts exists (YES in step S710), then the processing advances to step S711. In step S711, the continuous-printing-priority-order assignment unit 204 assigns, to each corresponding part, the priority order starting from the immediately subsequent priority order that has been assigned last in descending order of the number of sheets of paper to be used.

More specifically, the priority order assigned to the part in the above-described manner describes the frequency of replacement of the paper feed cassette, which is executed to replenish the paper. Based on the priority order, the printing order with which the paper feed cassette needs to be least frequently replaced is determined by the following printing order changing processing.

In determining the priority order among parts of the same available number of types of paper, for the part jobs whose number of sheets of paper to be used is the same, the continuous-printing-priority-order assignment unit 204 assigns a higher priority order in ascending order of part job IDs within the same bookbinding job group.

If it is determined that only one corresponding part exists (NO in step S710), then the processing advances to step S712. In step S712, the continuous-printing-priority-order assignment unit 204 assigns, to the corresponding part, the priority order starting from the immediately subsequent priority order that has been assigned last. In the example illustrated in FIG. 19B, the priority order "3" is assigned to the part "body".

If the processing has advanced from step S711 or S712 to step S713, the continuous-printing-priority-order assignment unit 204 determines whether any part remains to which no priority order has not been assigned. If it is determined that no such part remains to which no priority order has not been assigned (NO in step S713), then the processing advances to step S716.

On the other hand, if it is determined that a part remains to which no priority order has not been assigned (YES in step S713), then the processing advances to step S714. In step S714, the continuous-printing-priority-order assignment unit 204 refers to each part job ticket of the parts to which no priority order has been assigned and assigns the priority order in descending order of the number of types of paper to be used for each remaining part.

Furthermore, in step S714, if any parts for which the same type of paper to be used has been set exist, the continuous-printing-priority-order assignment unit 204 assigns the priority order in ascending order of the numeric portion of the part job ID within the same bookbinding job group.

For the part to which the type of paper to be used less than or equal to the number of paper feed cassettes of the printing apparatus 214 has been set, time may be lost when the paper feed cassette to be used is switched (replaced) within the printing apparatus 214.

The priority order assigned in step S714 is assigned to consider the loss of time for the parts to which the number of types of paper to be used less than or equal to the number of paper feed cassettes provided to the printing apparatus 214 has been set. In the example illustrated in FIG. 19B, the priority order "4" is assigned to the part "cover". In step S716, because the priority order for all the parts has been completely assigned at this timing, the job list management unit 210 applies the continuous printing priority order assigned to each part to the job list.

On the other hand, if it is determined that "select" has been set in the information about the continuous printing priority order ("SELECT" in step S703), then the processing advances to step S715. In step S715, the continuous-printing-priority-order assignment unit 204 assigns the operator-selected priority order to each part.

After the job list 211 is subjected to the continuous-printing-priority-order assignment processing described above, the job list 211 becomes the job list illustrated in FIG. 19C, in which the continuous printing priority order has been assigned to the parts.

The printing order changing processing in step S405, which is processing for changing the printing order for the parts, will be described in detail later below with reference to the flow chart of FIG. 7. Each processing in the flow chart of FIG. 7 is implemented by the CPU 135 loading and executing a program for performing processing in each step illustrated in the flow chart of FIG. 7 from the storage device 139 on the memory unit 136.

Figure 7:
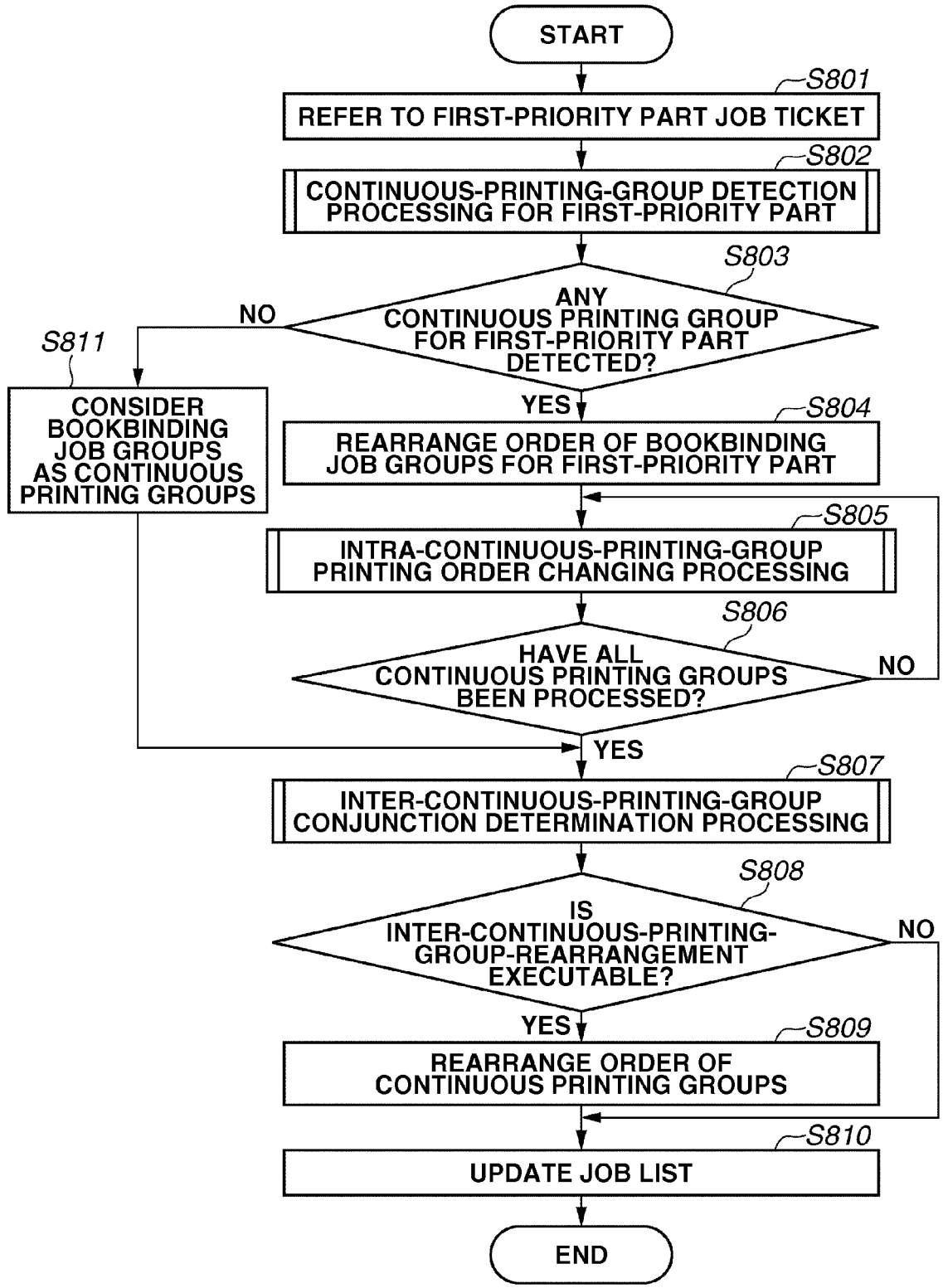
FIG. 7 is a flow chart illustrating an exemplary flow of printing order changing processing according to the first exemplary embodiment.

Referring to FIG. 7, in step S801, the printing availability determination unit 205 refers to each job ticket for the first-priority part and acquires information about the paper to be used in the print job. In step S802, the printing availability determination unit (a detection unit) 205 executes detection from among a plurality of bookbinding job groups including part jobs, for the first-priority part, which can be continuously printed, as a continuous printing group for the first-priority part.

The first-priority part is determined based on the continuous printing priority order. Similarly, an N-th priority order part, which will be described in detail later below, is determined based on the continuous printing priority order. The continuous-printing-group detection processing in step S802 will be described in detail later below with reference to the flow chart of FIG. 9.

If a continuous printing group has been detected by the printing availability determination unit 205 as a result of the continuous-printing-group detection processing in step S802 (YES in step S803), then the processing advances to step S804. In step S804, the job group management unit (determination unit) 212 derives the printing order included in the part job ticket to satisfy the following condition.

More specifically, in changing the order of printing the print jobs included in the continuous printing group for the first-priority part, the printing order is rearranged so that the printing order is continued among the part jobs for each part and that the printing order within each part of each part job included in the same bookbinding job group becomes the same as one another.

In step S805, the job group management unit 212 executes processing for changing the order of processing the part job tickets included in each continuous-printing group for the first-priority part.

The intra-continuous-printing-group printing order changing processing in step S805 will be described in detail later below with reference to the flow chart of FIG. 8.

In step S806, the job group management unit 212 determines whether the intra-continuous-printing-group printing order changing processing has been completely executed on all the continuous-printing groups for the first-priority part. If it is determined that the intra-continuous-printing-group printing order changing processing has been completely executed on all the continuous-printing groups for the first-priority part (YES in step S806), then the processing advances to step S807. In step S807, the printing availability determination unit 205 executes inter-continuous-printing-group conjunction determination processing. Furthermore, the printing availability determination unit 205 stores inter-group arrangement order information on the storage device 139. The inter-continuous-printing-group conjunction determination processing in step S807 will be described in detail later below.

In step S808, the job group management unit 212 determines whether the inter-continuous-printing-group-rearrangement can be executed according to inter-group arrangement order information stored in step S807. If it is determined that the inter-continuous-printing-group-rearrangement can be executed (YES in step S808), then the processing advances to step S809. In step S809, the job group management unit 212 rearranges the printing order for each continuous printing group for the first-priority part based on the inter-group arrangement information stored in step S807. On the other hand, if it is determined that the inter-continuous-printing-group-rearrangement cannot be executed (NO in step S808), then the processing advances to step S810.

In addition, the job list management unit 210 applies the printing order for each part job ticket to the job list 211 as a result of each processing (application of job list).

After the continuous-printing-group detection processing in step S802, if it is determined that no continuous printing group has been detected (NO in step S803), then the processing advances to step S811. In step S811, the job group management unit 212 considers each bookbinding job group as a continuous printing group for the first-priority part to continue to subsequent processing. Then the processing advances to step S807.

The continuous-printing-group detection processing in step S802 will be described in detail below with reference to the flow chart of FIG. 9. Each processing in the flow chart of FIG. 9 is implemented by the CPU 135 loading and executing a program for performing processing in each step illustrated in the flow chart of FIG. 9 from the storage device 139 on the memory unit 136.

Figure 9:
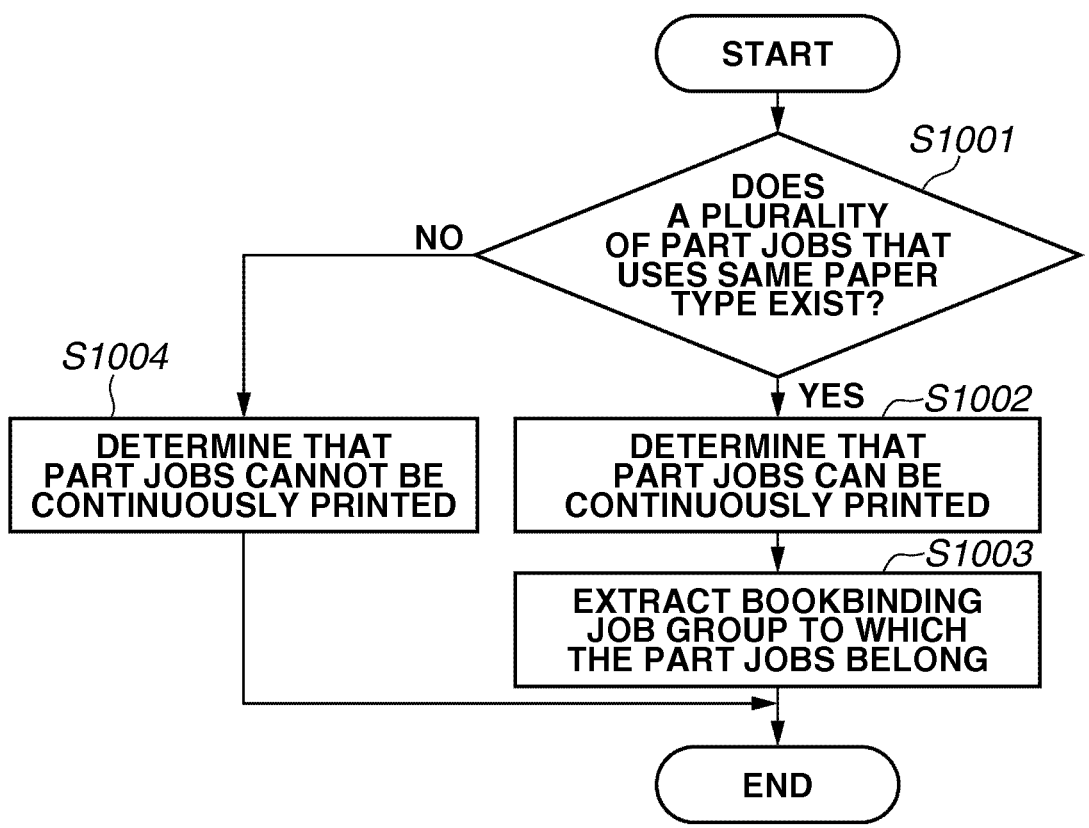
FIG. 9 is a flow chart illustrating an exemplary flow of continuous-printing-group detection processing according to the first exemplary embodiment.

Referring to FIG. 9, in step S1001, the printing availability determination unit 205 refers to the part job ticket for the part (for example, the first-priority part) for which the continuous printing group is to be detected. In addition, the printing availability determination unit 205 determines whether a plurality of part jobs that uses the same type of paper exists. In the present exemplary embodiment, if attributes of paper, such as the color, the type, and the size, are the same, the paper is defined to be of the same type (a common type of paper).

If it is determined that a plurality of part jobs that uses the same type of paper exists (YES in step S1001), then the processing advances to step S1002. In step S1002, the printing availability determination unit 205 determines that the part jobs can be continuously printed.

If it is determined that the part jobs can be continuously printed, then in step S1003, the job group management unit 212 extracts all the bookbinding job groups to which the part jobs belong. Then, the continuous-printing-group detection processing ends and the processing advances to step S803.

If the same type of paper is not used by a plurality of part jobs (NO in step S1001), then the processing advances to step S1004. In step S1004, the printing availability determination unit 205 determines that continuous printing is not available. Furthermore, the continuous-printing-group detection processing ends and the processing the processing advances to step S803.

In the continuous-printing-group detection processing, the continuous printing group may be detected according to of which part the part job ticket has been referred to. More specifically, a continuous printing group detected when a part job ticket for the first-priority part is referred to is different from a continuous printing group detected when a part job ticket for the second-priority part is referred to. In the present exemplary embodiment, a continuous printing group detected when a part job ticket for the M-th priority part is referred to is referred to as a "continuous printing group for the M-th priority part".

An exemplary flow of the processing will be described in detail later below with reference to the order information illustrated in FIG. 18 and the job list illustrated in FIG. 19C.

To focus on the first-priority part "wrapper band", bookbinding job groups "T001J01", "T002J01", and "T004J01", which respectively include part jobs "T001J01P01", "T002J01P01", and "T004J01P01", to which the paper color "blue" has been set, are detected as the continuous printing group for the first-priority part.

More specifically, if the first-priority part "wrapper band" is considered as a first print job group, the part jobs "T002J01P1" and "T004J01P01" are detected as a first print job and a second print job, respectively. Similarly, two bookbinding job groups "T001J02" and "T003J02" and an independent bookbinding job group "T003J01" are detected as different continuous printing groups for the first-priority part.

The intra-continuous-printing-group printing order changing processing in step S805 will be described in detail below with reference to the flow chart of FIG. 8. Each processing in the flow chart of FIG. 8 is implemented by the CPU 135 loading and executing a program for performing processing in each step illustrated in the flow chart of FIG. 8 from the storage device 139 on the memory unit 136.

Figure 8:
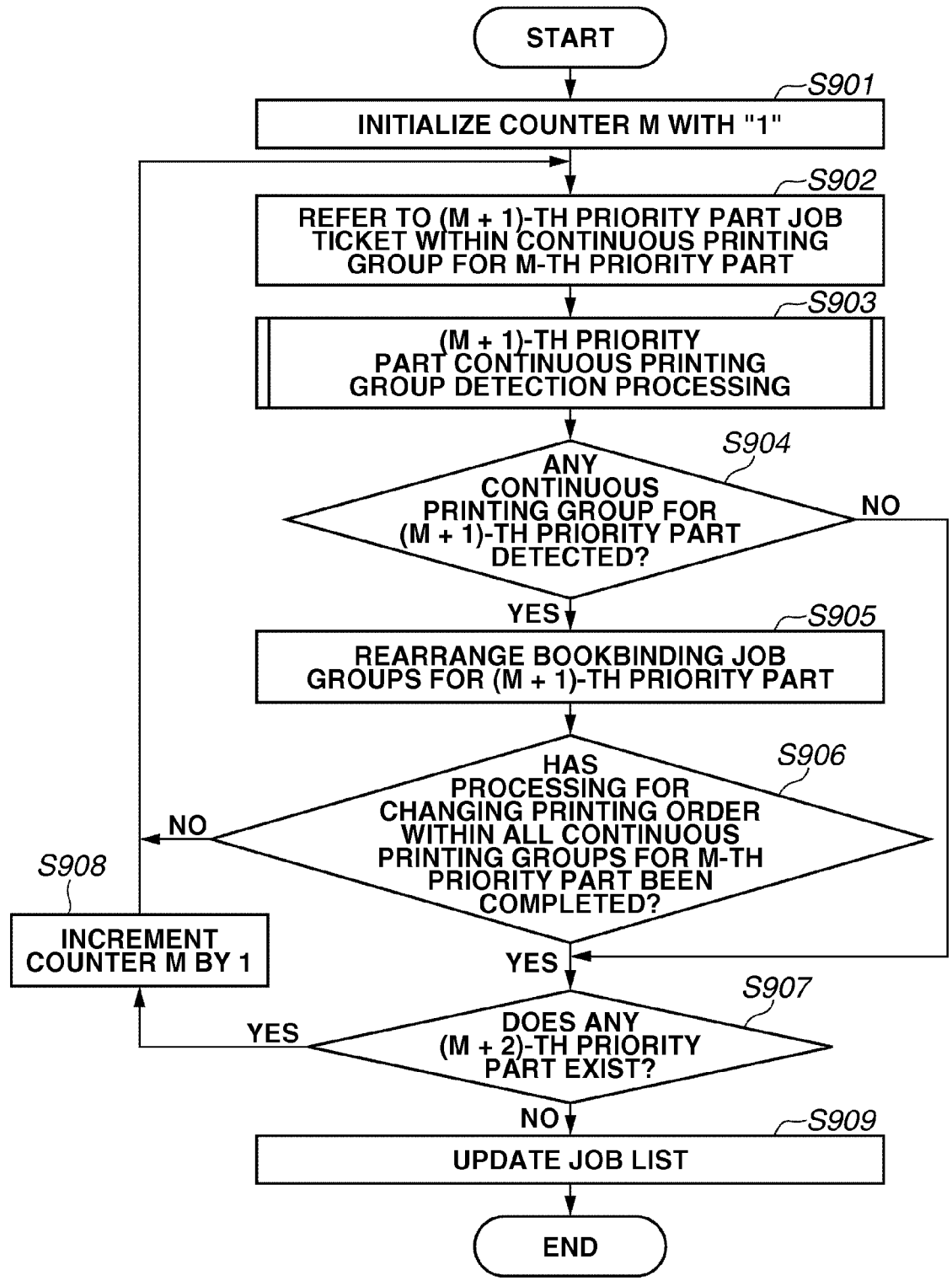
FIG. 8 is a flow chart illustrating an exemplary flow of intra-continuous-printing-group printing order changing processing according to the first exemplary embodiment.

Referring to FIG. 8, in step S901, the printing availability determination unit 205 initializes a priority order counter M with a value "1". In step S902, the printing availability determination unit 205 refers to part job tickets for an (M+1)-th priority part within continuous printing groups for an M-th priority part and acquires information about the paper used in the part jobs (print jobs).

As described above, the printing availability determination unit 205 acquires paper information for parts of a lower priority order considering the priority order for parts of a higher priority order.

The continuous printing groups for the M-th priority part used in step S902 are constituted by bookbinding job groups included in the continuous printing groups for an (M−1)-th priority part. The continuous printing groups for the (M−1)-th priority part are constituted by bookbinding job groups included in the continuous printing groups for an (M−2)-th priority part.

The continuous printing group for the M-th priority part is detected in the above-described nesting. The paper information for the (M+1)-th priority part to be acquired is generated by considering the part of a higher priority order.

In step S903, the printing availability determination unit 205 detects a continuous printing group for the (M+1)-th priority part from among a plurality of bookbinding job groups including part jobs that can be continuously printed for the (M+1)-th priority part within the continuous printing group for the M-th priority part. The continuous-printing-group detection processing in step S903 is similar to the continuous-printing-group detection processing in step S802 described above.

In the example illustrated in FIG. 19C, the bookbinding job groups (T001J01 and T004J01) for the second-priority part "dust jacket", whose paper color is blue, are detected from the continuous printing group (T001J01, T002J01, and T004J01) for the first-priority part "wrapper band", whose paper color is blue, as the continuous printing group for the second-priority part. In other words, if the second-priority part "dust jacket" is considered as a second print job group, the part jobs "T002J01P2" and "T004J01P02" are detected as a third print job and a fourth print job, respectively. Processing similar to the above-described processing for the continuous printing group is executed on the continuous printing group for the other second-priority parts.

As a result of the continuous-printing-group detection processing in step S903, if it is determined by the printing availability determination unit 205 that any continuous printing group has been detected, then the processing advances to step S905. In step S905, the job group management unit 212 derives the printing order for the part job tickets to satisfy the following condition.

More specifically, in changing the order of printing the part jobs included in the continuous printing group for the (M+1)-th priority part detected within the continuous printing groups for the M-th priority part, the printing order is rearranged so that the printing order is continued among the part jobs for each part and that the printing order within each part of each part job included in the same bookbinding job group becomes the same as one another.

In other words, in conjunction with the change of the printing order for the M-th priority part in the part job, the printing order for the other parts included in the same bookbinding job group as the part job is also changed. In the example illustrated in FIG. 19C, the bookbinding job groups are rearranged in the order of T001J01, T004J01, and T002J01 to allow the bookbinding job groups T001J01 and T004J01 to be grouped as a continuous printing group for the second-priority part (FIG. 19D).

In step S906, the job group management unit 212 determines whether all the continuous printing groups for the M-th priority part have been subjected to the printing order changing processing within the continuous printing groups. In the example illustrated in FIG. 19C, for the continuous printing groups for the first-priority part "wrapper band", whose paper color is red, the paper color is white for all the second-priority part "dust jacket". Accordingly, no rearrangement is executed. For the continuous printing groups for the first-priority part "wrapper band", whose paper color is white, one bookbinding job group exists. Accordingly, no rearrangement is executed.

If it is determined that all the continuous printing groups for the M-th priority part have been subjected to the printing order changing processing within the continuous printing groups (YES in step S906), then the processing advances to step S907. In step S907, the printing availability determination unit 205 determines whether any (M+2)-th priority part exists.

If it is determined that an (M+2)-th priority part exists (YES in step S907), then the processing advances to step S908. In step S908, the printing availability determination unit 205 increments the priority order counter M with "1".

Then the processing from step S902 is repeated. In the example illustrated in FIG. 19C, it is determined that the third-priority part "body" exists. Then the processing from step S902 is repeated.

If it is determined that no (M+2)-th priority part exists (NO in step S907), then the processing advances to step S909. In step S909, the job list management unit 210 applies the priority order for each part job ticket to the job list. After the intra-continuous-printing-group printing order changing processing is completed, the job list illustrated in FIG. 19D is generated.

The inter-continuous-printing-group conjunction determination processing in step S807 will be described in detail below with reference to the flow chart of FIG. 10. Each processing in the flow chart of FIG. 10 is implemented by the CPU 135 loading and executing a program for performing processing in each step illustrated in the flow chart of FIG. 10 from the storage device 139 on the memory unit 136.

Figure 10:
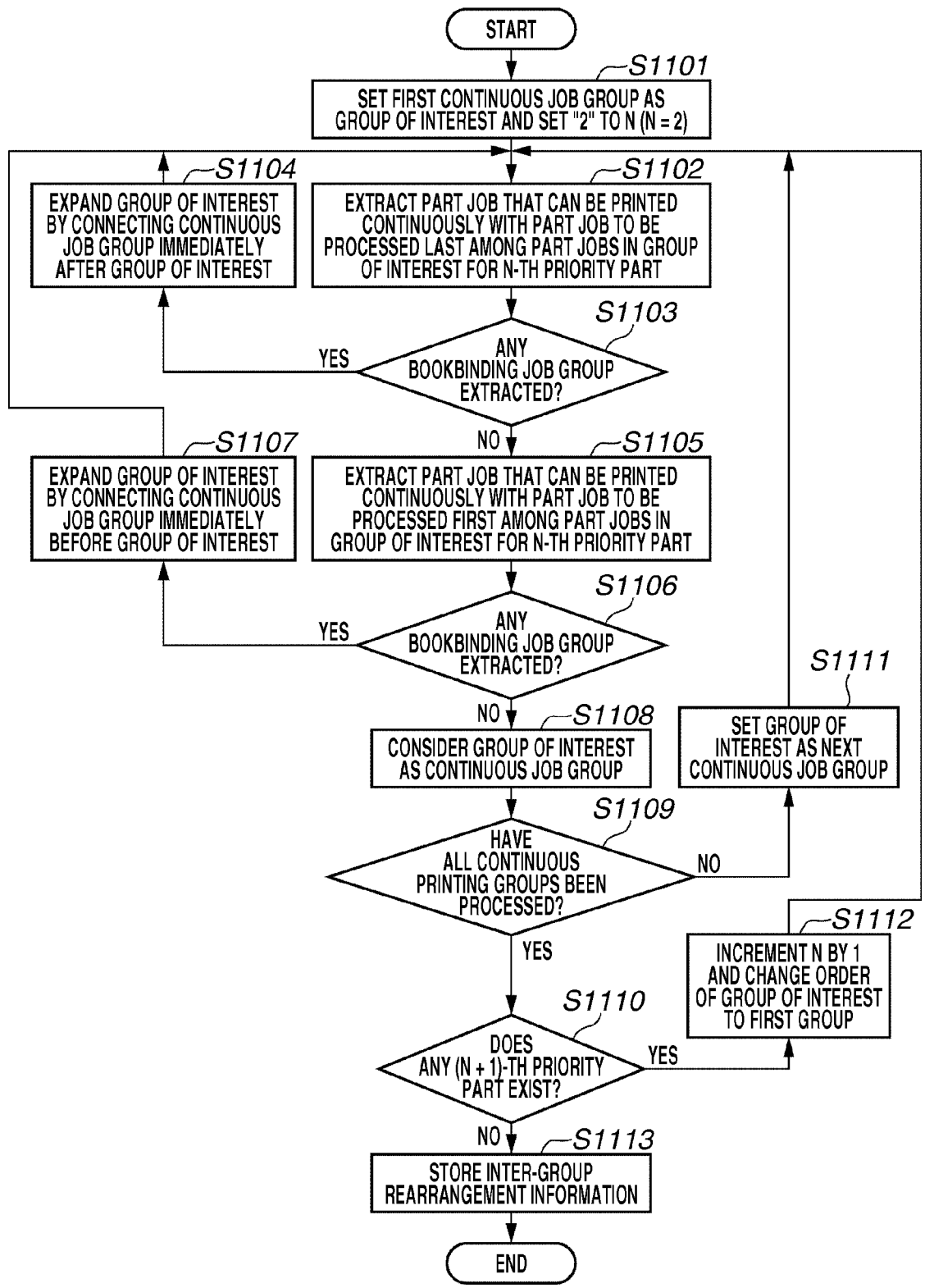
FIG. 10 is a flow chart illustrating an exemplary flow of inter-continuous-printing-group conjunction determination processing according to the first exemplary embodiment.

Referring to FIG. 10, in step S1101, the printing availability determination unit 205 initializes the priority order counter N with a value "2". In addition, the printing availability determination unit 205 sets the continuous printing group for the first-priority part, which has the first processing order on the job list, as a group of interest. In the example illustrated in FIG. 19D, the continuous printing group (T001J01, T004J01, and T002J01) for the first-priority part is set as the group of interest.

In step S1102, the printing availability determination unit 205 detects a part job having common paper information with the last part job having the last processing order within the group of interest from the first part job included in a continuous printing group for the first-priority part other than the group of interest. In addition, in step S1102, the printing availability determination unit 205 extracts a bookbinding job group including the detected part job. In the example illustrated in FIG. 19D, a bookbinding job group T003J01 is extracted. More specifically, part jobs "T003J01P1" and "T003J01P02" are detected as a fifth print job and a sixth print job, respectively.

In step S1103, the printing availability determination unit 205 determines whether any bookbinding job group has been extracted. If it is determined that any bookbinding job group has been extracted (YES in step S1103), then the processing advances to step S1104. In step S1104, the printing availability determination unit 205 connects the continuous printing group for the first-priority part including the extracted bookbinding job group with the group of interest immediately after the group of interest to expand the group of interest. Then the processing advances to step S1102. Information about the connection (inter-group arrangement order information) is stored in the following step S1113. In the example illustrated in FIG. 19D, the group of interest is expanded to be constituted by four bookbinding job groups T001J01, T004J01, T002J01, and T003J01.

If it is determined that no bookbinding job group has been extracted (NO in step S1103), then the processing advances to step S1105. In step S1105, the printing availability determination unit 205 detects a part job having common paper information with the first part job in the processing order within the group of interest from the last part job included in a continuous printing group for the first-priority part other than the group of interest. In addition, in step S1105, the printing availability determination unit 205 extracts a bookbinding job group including the detected part job.

In step S1106, the printing availability determination unit 205 determines whether any bookbinding job group has been extracted. If it is determined that any bookbinding job group has been extracted (YES in step S1106), then the processing advances to step S1107. In step S1107, the printing availability determination unit 205 connects the continuous printing group for the first-priority part including the extracted bookbinding job group to the group of interest before the group of interest to expand the group of interest. Then the processing advances to step S1102.

Information about the connected state (inter-group arrangement order information) is stored in step S1113, which will be described in detail below.

On the other hand, if it is determined that no bookbinding job group has been extracted (NO in step S1106), then the processing advances to step S1108. In step S1108, the printing availability determination unit 205 considers the group of interest as the continuous printing group for the first-priority part during the execution of the processing illustrated in FIG. 10.

In step S1109, the printing availability determination unit 205 determines whether the processing in steps S1102 through 1108 has been executed on an N-th priority part for all the continuous printing groups for the first-priority part. If it is determined that the above-described processing has been executed (YES in step S1109), then the processing advances to step S1110. In step S1110, the printing availability determination unit 205 determines whether any (N+1)-th priority part exists.

On the other hand, if it is determined that the above-described processing has not been executed (NO in step S1109), then the processing advances to step S1111. In step S1111, the printing availability determination unit 205 sets the continuous printing group for the first-priority part that is the next continuous printing group in the processing order described in the job list as the next group of interest. Then the processing advances to step S1102.

If it is determined that an (N+1)-th priority part exists (YES in step S1110), then the processing advances to step S1112. In step S1112, the printing availability determination unit 205 increments a priority order counter N by 1 and sets the first group among the groups that have been considered as the continuous job group up to that timing as the group of interest.

In the example illustrated in FIG. 19D, the group of interest is constituted by four bookbinding job groups T001J01, T004J01, T002J01, and T003J01. Then the processing advances to step S1102.

By examining the availability of inter-group continuous printing for the next part (the (N+1)-th priority part), it is determined that the continuous printing in the printing order of T003J01P4 and T001J02P4 (third-priority part jobs) is available in the example illustrated in FIG. 19D.

On the other hand, if it is determined that no (N+1)-th priority part exists (NO in step S1110), then the processing advances to step S1113. In step S1113, the printing availability determination unit 205 stores information about the connection among the continuous printing groups for the first-priority part, which is generated by executing the flow of processing in steps S1101 through S1112 (inter-group arrangement order information), on the memory unit 136. The inter-group arrangement order information describes whether inter-group continuous printing is available.

If it is determined in steps S1103 and S1106 that no bookbinding job group has been extracted, the printing availability determination unit 205 adds information describing that inter-group continuous printing is not available to the inter-group arrangement order information. Similarly, if it is determined in steps S1103 and S1106 that at least one bookbinding job group has been extracted, the printing availability determination unit 205 adds information describing that inter-group continuous printing is available to the inter-group arrangement order information.

By executing the inter-continuous-printing-group conjunction determination processing described above, the inter-group arrangement order information, based on which the job list illustrated in FIG. 19D is converted into the job list illustrated in FIG. 19E, is stored on the storage device 139.

By executing the processing in the above-described manner, the present exemplary embodiment can increase the opportunity of continuous printing for each part and reduce the necessary operations for replacing the paper. As a result, the present exemplary embodiment can reduce the time necessary for printing.

In the present exemplary embodiment, the printing order for the parts constituting the same photo book is kept appropriately arranged. Accordingly, the present exemplary embodiment can prevent the possible degradation of the operation efficiency during the combination of printed parts.

The present exemplary embodiment is limited neither to the method for rearranging the processing order within the continuous printing group described above nor to the method for rearranging the processing order among the continuous printing groups. In other words, the processing order can be rearranged if the part jobs can continuously use the same type of paper.

For example, suppose that a plurality of bookbinding job groups has been extracted and the plurality of bookbinding job group has been set as the continuous printing groups. In this case, for the plurality of continuous printing groups, the processing order can be rearranged considering the availability of the continuous printing for the part having a lower priority order.

However, in rearranging the processing order, it is necessary that the rearrangement of order of processing part jobs and the rearrangement of order of processing bookbinding job groups are performed in conjunction with each other.

In the first exemplary embodiment, the opportunity of continuous printing using the same type of paper for each part is increased. In addition, in the first exemplary embodiment, one piece of content data is printed on one sheet of printing paper. In a second exemplary embodiment, simultaneous printing is executed, which is printing processing for simultaneously printing a plurality of pieces of content data on the same sheet.

In the present exemplary embodiment, simultaneous printing refers to printing of different pieces of content data A and B on the same sheet as illustrated with simultaneous imposition 2901 in FIG. 21A.

Figure 11A:
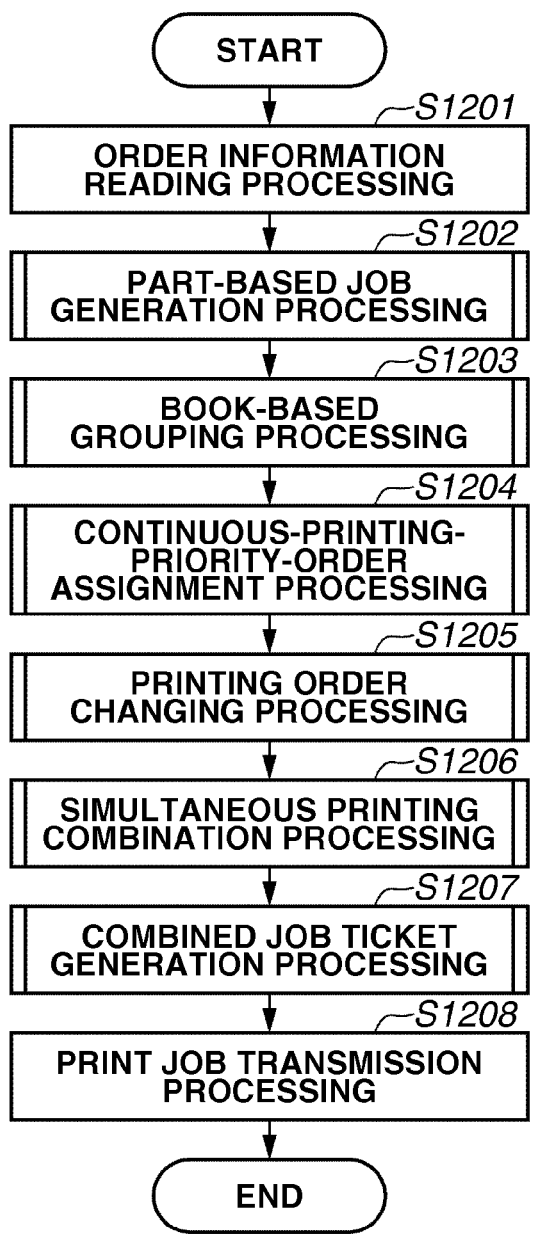
FIGS. 11A and 11B are flow charts illustrating an exemplary flow of processing executed by a printing control apparatus according to each of a second exemplary embodiment and a fourth exemplary embodiment.

Processing executed by the printing control apparatus 101 according to the present exemplary embodiment will be described in detail below with reference to the flow charts of FIGS. 11A, 12A, 13, and 14A. Each processing in the flow chart of FIG. 11A is implemented by the CPU 135 loading and executing a program for performing processing in each step illustrated in the flow chart of FIG. 11A from the storage device 139 on the memory unit 136.

Unless otherwise described, the printing control apparatus 101 according to the present exemplary embodiment has the same configuration as the first exemplary embodiment. Referring to FIG. 11A, processing from steps S1201 through S1205 is similar to the processing in steps S401 through S405 according to the first exemplary embodiment. Accordingly, the detailed description thereof will not be repeated here.

After the processing in step S1205, the processing advances to step S1206. In step S1206, the printing availability determination unit 205 determines whether a plurality of part jobs can be continuously printed on the same sheet for each part by simultaneous printing (simultaneous printing availability determination). In addition, in step S1206, the printing availability determination unit 205 extracts a combination of part jobs that can be simultaneously printed. The simultaneous printing combination processing in step S1206 will be described in detail later below.

In step S1207, the job ticket management unit 208 generates a simultaneous printing combined job ticket (hereinafter also referred to as a "combined part job" or "combined print job"), which is a part job generated by combining part jobs to be combined together by simultaneous printing extracted in step S1206. The combined job ticket generation processing in step S1207 will be described in detail later below.

In step S1208, the job transmission unit 213 outputs the combined part job generated according to the processing order included in the job list 211 to the printing apparatus 214, such as an MFP, or the post-processing apparatus 215, such as a bookbinding machine or a cutting machine.

The simultaneous printing combination processing in step S1206, which is processing for extracting a combination of part jobs and which allows the simultaneous printing on the same printing sheet, will be described in detail below with reference to the flow chart of FIG. 12A. Each processing in the flow chart of FIG. 12A is implemented by the CPU 135 loading and executing a program for performing processing in each step illustrated in the flow chart of FIG. 12A from the storage device 139 on the memory unit 136.

Referring to FIG. 12A, in step S1301, the printing availability determination unit 205 initializes the priority order counter M with a value "1". In step S1302, the printing availability determination unit 205, in referring to the job ticket, sets a part of a priority order M (an M-th priority part) as a reference target for the continuous printing priority order.

In step S1303, the printing availability determination unit 205 initializes the printing order counter N with a value "1". In step S1304, the printing availability determination unit 205, in referring to the job ticket, the printing availability determination unit 205 sets the bookbinding job groups having the printing orders N and (N+1) as reference targets for determining the printing order. The processing order in the job list is directly used as the printing order.

In step S1305, the printing availability determination unit 205 extracts a part job ticket having the priority order M, which belongs to the bookbinding job group having the printing order N, as a first reference part job ticket. In step S1306, the printing availability determination unit 205 extracts a part job ticket having the priority order M, which belongs to the bookbinding job group having the printing order (N+1), as a second reference part job ticket.

In step S1307, the printing availability determination unit 205 compares the first reference part job ticket and the second reference part job ticket to determine the availability of the simultaneous printing. The simultaneous printing availability determination processing in step S1307 will be described in detail later below.

If it is determined that the simultaneous printing is available (YES in step S1308), then the processing advances to step S1309. In step S1309, the printing availability determination unit 205 assigns a combination ID to the combination of the mutually compared first reference part job ticket and the second reference part job ticket.

In step S1310, the printing availability determination unit 205 increments the printing order counter N by "2".

If it is determined that the simultaneous printing is not available (NO in step S1308), then the processing advances to step S1312. In step S1312, the printing availability determination unit 205 increments the printing order counter N by "1".

In step S1311, the printing availability determination unit 205, in referring to the job ticket, sets the bookbinding job groups having the printing orders N and (N+1) as reference targets for determining the printing order. In step S1313, the printing availability determination unit 205 determines whether any part job ticket having the priority order M, which belongs to the bookbinding job group having the printing order (N+1), exists.

If it is determined that a part job ticket having the priority order M belonging to the bookbinding job group having the printing order (N+1) exists (YES in step S1313), then the printing availability determination unit 205 repeats the processing in step S1305 and subsequent steps. On the other hand, if it is determined that no part job ticket having the priority order M belonging to the bookbinding job group having the printing order (N+1) exists (NO in step S1313), then the processing advances to step S1314. In step S1314, the printing availability determination unit 205 increments the priority order counter M by "1".

In step S1315, the printing availability determination unit 205 determines whether any M-th priority part exists. If it is determined that an M-th priority part exists (YES in step S1315), then the printing availability determination unit 205 repeats the processing in step S1302 and subsequent steps. On the other hand, if it is determined that no M-th priority part exists (NO in step S1315), then the processing advances to step S909 (FIG. 8). In step S909, the job list management unit 210 applies the combination ID assigned to the combination of part job tickets to the job list.

For the combination ID, the same ID is assigned to a plurality of part jobs as illustrated in FIG. 22A as the job list. In the job list illustrated in FIG. 22A, the content of the order information 207 is applied similar to the job lists illustrated in FIGS. 19A through 19E.

The simultaneous printing availability determination processing in step S1307, which is processing for determining whether part jobs can be simultaneously printed according to a result of comparison between the first reference part job ticket and the second reference part job ticket, will be described in detail below with reference to the flow chart of FIG. 13.

Figure 13:
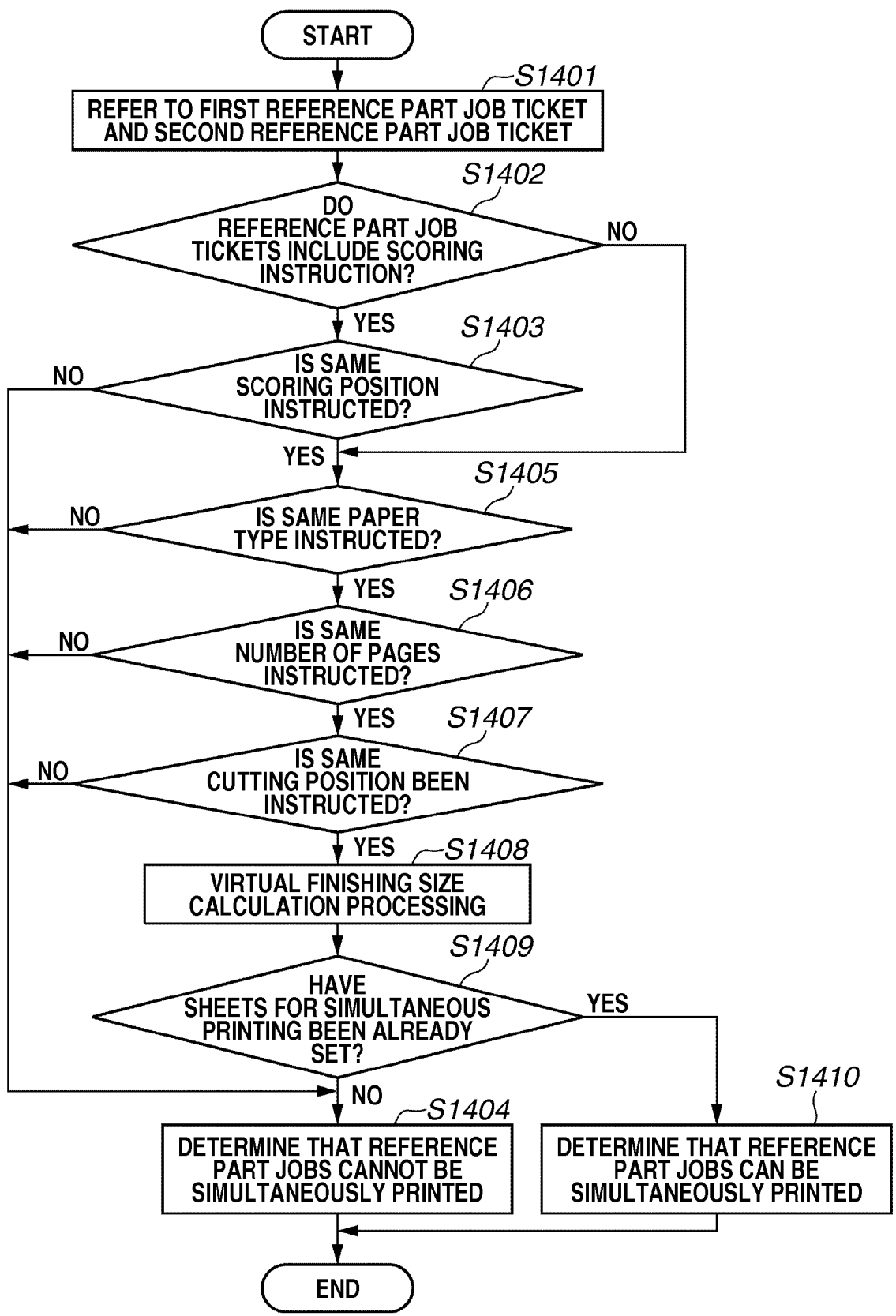
FIG. 13 is a flow chart illustrating an exemplary flow of simultaneous printing availability determination processing according to each of the second exemplary embodiment and the fourth exemplary embodiment.

Each processing in the flow chart of FIG. 13 is implemented by the CPU 135 loading and executing a program for performing processing in each step illustrated in the flowchart of FIG. 13 from the storage device 139 on the memory unit 136.

Referring to FIG. 13, in step S1401, the printing availability determination unit 205 refers to the first reference part job ticket and the second reference part job ticket and acquires paper sheet information and print instruction information. In step S1402, the printing availability determination unit 205 determines whether any scoring setting instruction is included in the first reference part job ticket and the second reference part job ticket. In the present exemplary embodiment, scoring processing refers to processing for providing a scoring line on one sheet.

If it is determined that a scoring setting instruction is included (YES in step S1402), then the processing advances to step S1403. In step S1403, the printing availability determination unit 205 determines whether the scoring positions, which are included in the scoring setting instruction in the first reference part job ticket and the second reference part job ticket, are the same as each other.

If it is determined that the scoring positions, which are included in the scoring setting instruction in the first reference part job ticket and the second reference part job ticket, are different from each other (NO in step S1403), then the processing advances to step S1404. In step S1404, the printing availability determination unit 205 determines that the part jobs cannot be simultaneously printed.

More specifically, in this case, because the scoring processing is executed on the entire sheet, it is determined that the part jobs cannot be simultaneously printed if a plurality of contents are simultaneously composed on the same sheet and if the scoring lines are to be provided at laterally different positions on the sheet for each content.

If it is determined that no scoring setting instruction has been set (NO in step S1402) or if the same scoring positions are instructed in the scoring setting instruction (YES in step S1403), then the processing advances to step S1405. In step S1405, the printing availability determination unit 205 determines whether the same (common) type of paper has been designated.

If it is determined that the same (common) type of paper has been designated (YES in step S1405), then the processing advances to step S1406. In step S1406, the printing availability determination unit 205 determines whether the number of pages to be printed is the same (mutually equivalent) for the first reference part job ticket and the second reference part job ticket.

If it is determined that the number of pages to be printed is the same (mutually equivalent) for the first reference part job ticket and the second reference part job ticket (YES in step S1406), then the processing advances to step S1407. In step S1407, the printing availability determination unit 205 determines whether the same (mutually identical) cutting position has been designated.

If it is determined that the same (mutually identical) cutting position has been designated (YES in step S1408), then the printing availability determination unit 205 calculates the finishing size in simultaneous printing. The term "finishing size" refers to the size of a sheet onto which a plurality of contents is disposed on the same sheet as illustrated with the sheet 2901 or 2902 in FIG. 21A.

In step S1409, the printing availability determination unit 205 determines whether sheets of the calculated size have been set to the paper feed cassette. If it is determined that the sheets of the calculated size have been set to the paper feed cassette (YES in step S1409), then the processing advances to step S1410. In step S1410, the printing availability determination unit 205 determines that the part jobs can be simultaneously printed.

If the result of the determination in step S1405, S1406, S1407, or S1409 is negative ("not the same" or "no paper"), Then the processing advances to step S1404. In step S1404, the printing availability determination unit 205 determines that the part jobs cannot be simultaneously printed.

The combined job ticket generation processing in step S1207, which is processing for generating a simultaneous printing combined job ticket by combining part jobs based on a combination of part jobs that can be simultaneously printed, will be described in detail below with reference to the flow chart of FIG. 14A.

Each processing in the flow chart of FIG. 14A is implemented by the CPU 135 loading and executing a program for performing processing in each step illustrated in the flowchart of FIG. 14A from the storage device 139 on the memory unit 136. In the flow of processing illustrated in FIG. 14A, the job ticket management unit 208 functions as a job combination unit configured to generate a combined job ticket (a combined part job).

Referring to FIG. 14A, in step S1501, the job ticket management unit 208 extracts part job ticket having the same combination ID. In step S1502, the job ticket management unit 208 combines imposition images together (for example, imposition images 2901 and 2902 illustrated in FIG. 21A) used for the simultaneous printing based on the content of the part job ticket having the same combination ID.

In step S1503, the job ticket management unit 208 combines the print instructions for simultaneous printing together, which are the print instructions included in the part job tickets having the same combination ID. In step S1504, the job ticket management unit 208 combines post-processing instructions together, which are the post-processing instructions included in the part job tickets having the same combination ID.

In step S1505, the job ticket management unit 208 assigns a combination job ID to the generated combined job ticket. In step S1506, the job list management unit 210 applies the generated combined job ticket (the combined part job) and the assigned combination job ID to the job list 211.

The combined job ticket and the assigned combination job ID are applied as illustrated in FIG. 22A as those in the job list (job list updating processing). By updating the job list in the above-described manner, the combination of the part jobs that can be simultaneously printed is substituted with the combined part job. Even after the combined part job is applied to the job list, the printing order for printing the other part jobs is not changed.

By executing the processing in the above-described manner, the opportunity of executing continuous printing that uses the same sheet for each part can be increased. In addition, the opportunity of simultaneously printing a plurality of pieces of content data on the same sheet can be increased. As a result, the present exemplary embodiment can effectively prevent wasteful consumption of paper and reduce the time taken for completing printing.

In the first exemplary embodiment and the second exemplary embodiment described above, the opportunity of executing continuous printing that uses the same sheet for each part can be increased. In addition, a plurality of pieces of content data composed on the same sheet is simultaneously printed. In a third exemplary embodiment, possible dispersion of jobs of a product addressed to the same distribution destination can be effectively prevented.

Each processing in the flow charts of the present exemplary embodiment is implemented by the CPU 135 of the printing control apparatus 101 loading and executing a program for performing processing in each step illustrated in the flow charts from the storage device 139. Unless otherwise described, the printing control apparatus according to the present exemplary embodiment has a configuration similar to that of the printing control apparatus according to the second exemplary embodiment.

Processing according to the present exemplary embodiment will be described in detail below with reference to FIG. 15.

Figure 15:
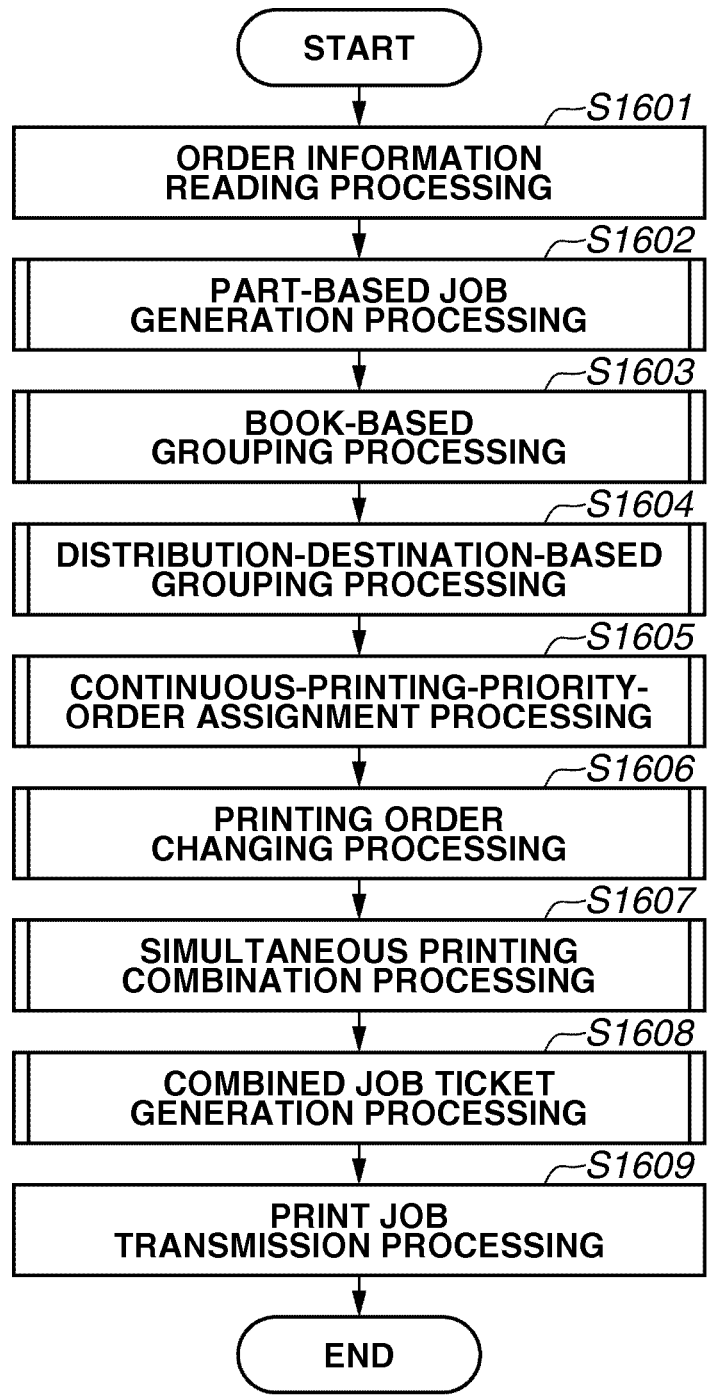
FIG. 15 is a flow chart illustrating an exemplary flow of processing executed by a printing control apparatus according to a third exemplary embodiment.

Each processing in the flow chart of FIG. 15 is implemented by the CPU 135 loading and executing a program for performing processing in each step illustrated in the flowchart of FIG. 15 from the storage device 139 on the memory unit 136.

Processing from steps S1601 through S1605 is similar to the processing in steps S401 through S403 according to the first exemplary embodiment. Accordingly, the detailed description thereof will not be repeated here.

After the processing in step S1603, in step S1604, the job group management unit 212 groups print jobs included in each book-based group. In the grouping processing, the job group management unit 212 groups photo books for the same distribution destination into the same job group. The job group is referred to as a "distribution job group".

The distribution destination-based grouping processing in step S1604 will be described in detail below.

In step S1605, the continuous-printing-priority-order assignment unit 204 assigns a priority order for continuous printing per each type of part. The continuous-printing-priority-order assignment processing in step S1605 is similar to the processing in step S404 according to the first exemplary embodiment described above. Accordingly, the detailed description thereof will not be repeated here.

In step S1606, the printing availability determination unit 205 determines whether the parts can be continuously printed in the continuous printing priority order. In addition, in step S1606, the printing availability determination unit 205 changes the printing order for printing the parts by changing the processing for distribution job group to allow the continuous printing that uses the same sheet.

The printing order changing processing in step S1606 will be described in detail below.

In step S1607, the printing availability determination unit 205 determines whether the part jobs can be simultaneously printed for each part. In addition, in step S1607, the printing availability determination unit 205 extracts a combination of part jobs with which the simultaneous printing on the same sheet can be executed.

The simultaneous printing combination processing in step S1607 is similar to the processing in step S1206 according to the second exemplary embodiment. Accordingly, the detailed description thereof will not be repeated here.

In step S1608, the job ticket management unit 208 generates simultaneous printing combined job ticket (combined part job) based on the part jobs, which are extracted by the processing in step S1206 and which are to be combined together. The combined job ticket generation processing in step S1608 is similar to the processing in step S1207 according to the second exemplary embodiment. Accordingly, the detailed description thereof will not be repeated here.

In step S1609, the job transmission unit 213 outputs the part jobs to the printing apparatus 214, such as an MFP, or the post-processing apparatus 215, such as a bookbinding machine or a cutting machine, according to the processing order described in the job list 211.

The distribution destination-based grouping processing in step S1604 for grouping photo books for the same distribution destination into the same job group for print jobs included in each print job will be described in detail below with reference to the flow chart of FIG. 16. Each processing in the flow chart of FIG. 16 is implemented by the CPU 135 loading and executing a program for performing processing in each step illustrated in the flow chart of FIG. 16 from the storage device 139 on the memory unit 136.

Figure 16:
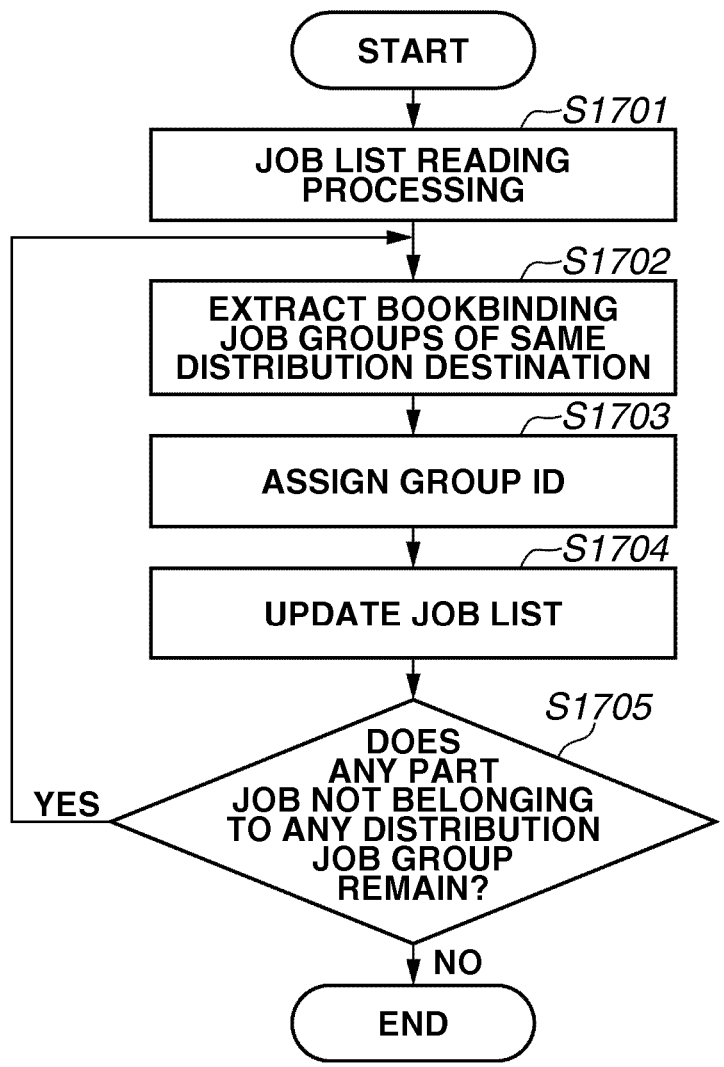
FIG. 16 is a flow chart illustrating an exemplary flow of distribution destination-based grouping processing according to the third exemplary embodiment.

Referring to FIG. 16, in step S1701, the job group management unit 212 reads the job list 211 from the storage device 139. In step S1702, the job group management unit 212 extracts bookbinding job groups to which the same distribution destination has been designated as another group.

In step S1703, the job group management unit 212 assigns the distribution destination group ID to another group including the extracted bookbinding job groups. The distribution destination group ID is the distribution destination group ID for the job list illustrated in FIG. 22B.

The job list illustrated in FIG. 22B includes the contents of the order information 207 similar to job lists illustrated in FIGS. 19A through 19E. In step S1704, the job list management unit 210 applies the association between the distribution destination group ID and each corresponding bookbinding job group to the job list.

In step S1705, the job group management unit 210 determines whether any bookbinding job group not belonging to any distribution job group remains. Furthermore, the job list management unit 210 repeats the processing in steps S1702 through S1704 until the distribution destination group IDs for all the bookbinding job groups are completely assigned.

The printing order changing processing in step S1606 for changing the printing order of the parts according to the present exemplary embodiment will be described in detail below with reference to the flow chart of FIG. 17. Each processing in the flow chart of FIG. 17 is implemented by the CPU 135 loading and executing a program for performing processing in each step illustrated in the flow chart of FIG. 17 from the storage device 139 on the memory unit 136.

Figure 17:
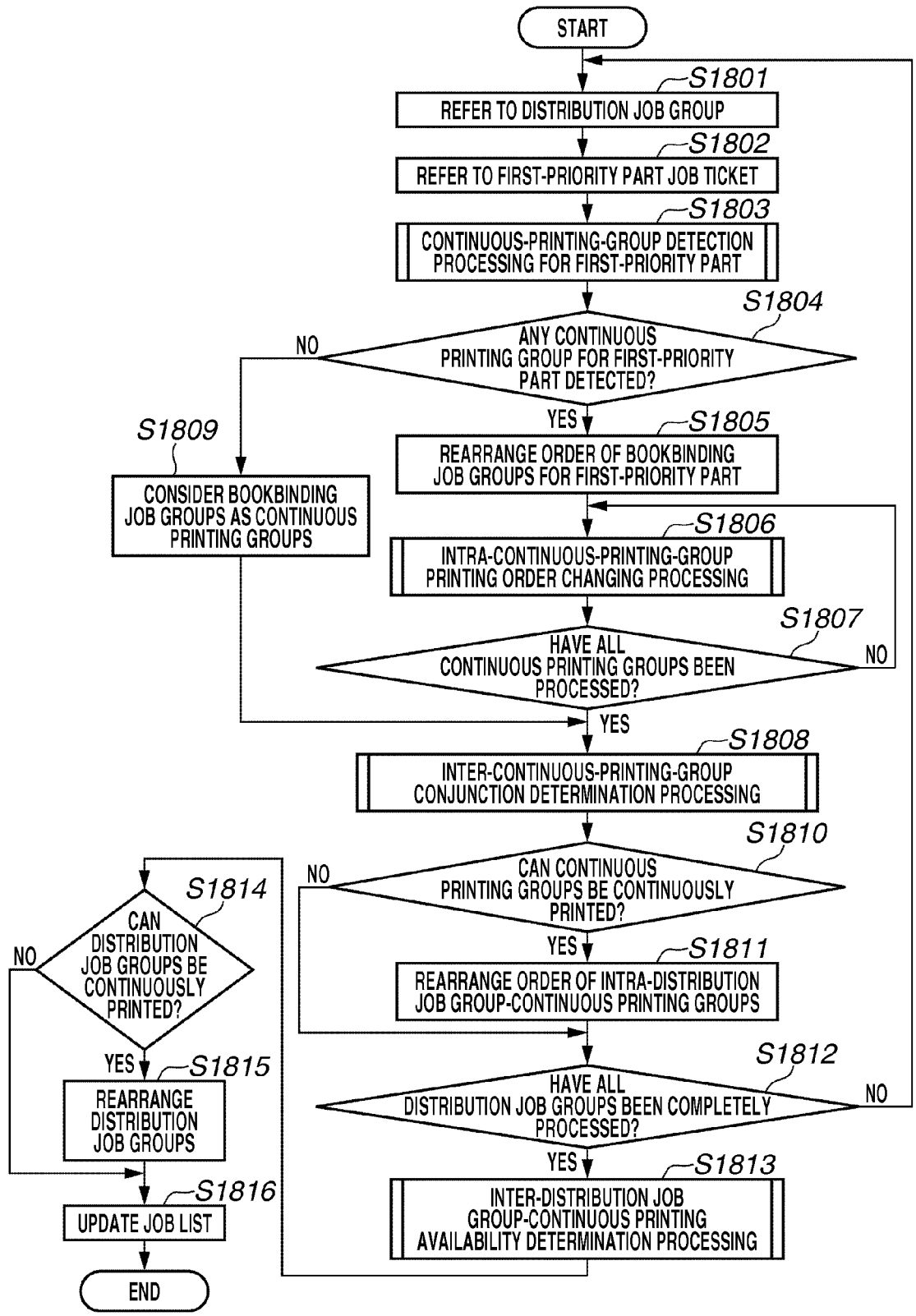
FIG. 17 is a flow chart illustrating an exemplary flow of printing order changing processing according to the third exemplary embodiment.

Referring to FIG. 17, in step S1801, the printing availability determination unit 205 refers to the distribution job group and acquires each job ticket from the bookbinding job group associated with the distribution destination group ID assigned to the distribution job group. In step S1802, the printing availability determination unit 205 refers to each job ticket for the first-priority part within the distribution job group and acquires sheet information about the sheet to be used in the print job.

In step S1803, the printing availability determination unit 205 detects a plurality of bookbinding job groups including the parts that can be continuously printed from among the distribution job group. In addition, in step S1803, the printing availability determination unit 205 sets the extracted plurality of bookbinding job groups as a continuous printing group.

The continuous-printing-group detection processing in step S1803 is similar to the processing in step S802 according to the first exemplary embodiment. Accordingly, the detailed description thereof will not be repeated here.

In step S1804, the printing availability determination unit 205a determines whether any continuous printing group has been detected. If it is determined that a continuous printing group has been detected (YES in step S1804), then the processing advances to step S1805. In step S1805, the printing availability determination unit 205 rearranges the printing order for printing the part job tickets. Furthermore, in the printing order rearrangement processing in step S1805, the printing availability determination unit 205 rearranges the printing order for printing the part job tickets by arranging the extracted plurality of bookbinding job groups to be successive to one another and by setting the same printing order for each part job included in the bookbinding job group.

In step S1806, the job group management unit 212 executes processing for changing the printing order for printing the part job tickets included in each continuous printing group. The intra-continuous-printing-group printing order changing processing in step S1806 is similar to the processing in step S805 according to the first exemplary embodiment. Accordingly, the detailed description thereof will not be repeated here.

In step S1807, the job group management unit 212 determines whether the processing for changing the printing order within the continuous printing group has been completely executed on all the continuous printing groups. If it is determined that the processing for changing the printing order within the continuous printing group has been completely executed on all the continuous printing groups (YES in step S1807), then the processing advances to step S1808.

In steps S1808 and S1810, the printing availability determination unit 205 determines whether the continuous printing groups included in the distribution job group can be continuously printed. The processing in steps S1808 and S1810 is similar to the processing in steps S807 and S808 according to the first exemplary embodiment. Accordingly, the detailed description thereof will not be repeated here.

If it is determined that the continuous printing groups included in the distribution job group can be continuously printed (YES in step S1810), then the processing advances to step S1811. In step S1811, the job group management unit 212 rearranges the groups that are the targets of connection of part jobs for continuous printing. In the rearrangement processing in step S1811, the job group management unit 212 rearranges the continuous printing connection target-groups by rearranging the part jobs that exist in the boundary between the continuous printing groups to be arranged successive to one another.

In step S1812, the job group management unit 212 determines whether the processing for changing the printing order within the distribution job group has been completely executed. If it is determined that the processing for changing the printing order within the distribution job group has been completely executed (YES in step S1812), then the processing advances to step S1813.

In step S1813, the printing availability determination unit 205 determines whether the distribution job groups can be continuously printed. The inter-distribution job group-continuous printing availability determination processing in step S1813 is similar to the inter-continuous-printing-group conjunction determination processing in step S807 according to the first exemplary embodiment if the continuous printing group in the inter-continuous-printing-group conjunction determination processing in step S807 is substituted with the distribution job group. Accordingly, the detailed description thereof will not be repeated here.

In step S1814, the printing availability determination unit 205 determines whether the distribution job groups can be continuously printed. If it is determined that the distribution job groups can be continuously printed (YES in step S1814), then the processing advances to step S1815. In step S1815, the job group management unit 212 rearranges the distribution job groups. In the rearrangement processing in step S1815, the job group management unit 212 rearranges the continuous printing connection-target groups by rearranging the part jobs that exist in the boundary between the distribution printing groups to be arranged successive to one another.

If it is determined that the distribution job groups can be continuously printed (YES in step S1814), then the processing advances to step S1816. In step S1816, the job list management unit 210 applies the printing order for printing each part job ticket to the job list as a result of each processing (job list updating processing).

By executing the processing in the above-described manner, the present exemplary embodiment can effectively prevent possible dispersion of the jobs of books for the same distribution destination. Accordingly, the present exemplary embodiment can effectively prevent possible degradation of the operation efficiency of an operation for sorting the generated print products for each distribution destination.

In the present exemplary embodiment, the method that uses the distribution job group is introduced to the methods according to a combination of the first exemplary embodiment and the second exemplary embodiment. However, the present invention is not limited to this. More specifically, alternatively, the rearrangement processing for rearranging the order of processing on the part jobs according to the first exemplary embodiment and the rearrangement processing for rearranging the distribution job groups according to the present exemplary embodiment can be executed in combination with each other without executing the simultaneous printing.

In the second exemplary embodiment described above, the opportunity of continuous printing using the same type of paper for each part is increased and a plurality of pieces of content data composed on the same sheet is printed. In a fourth exemplary embodiment, a combination mark is printed at the same time as simultaneously printing the plurality of pieces of content data composed on the same sheet. As illustrated in FIG. 21B, the combination mark is a mark for enabling the operator to visually verify a combination of parts.

Figure 11B:
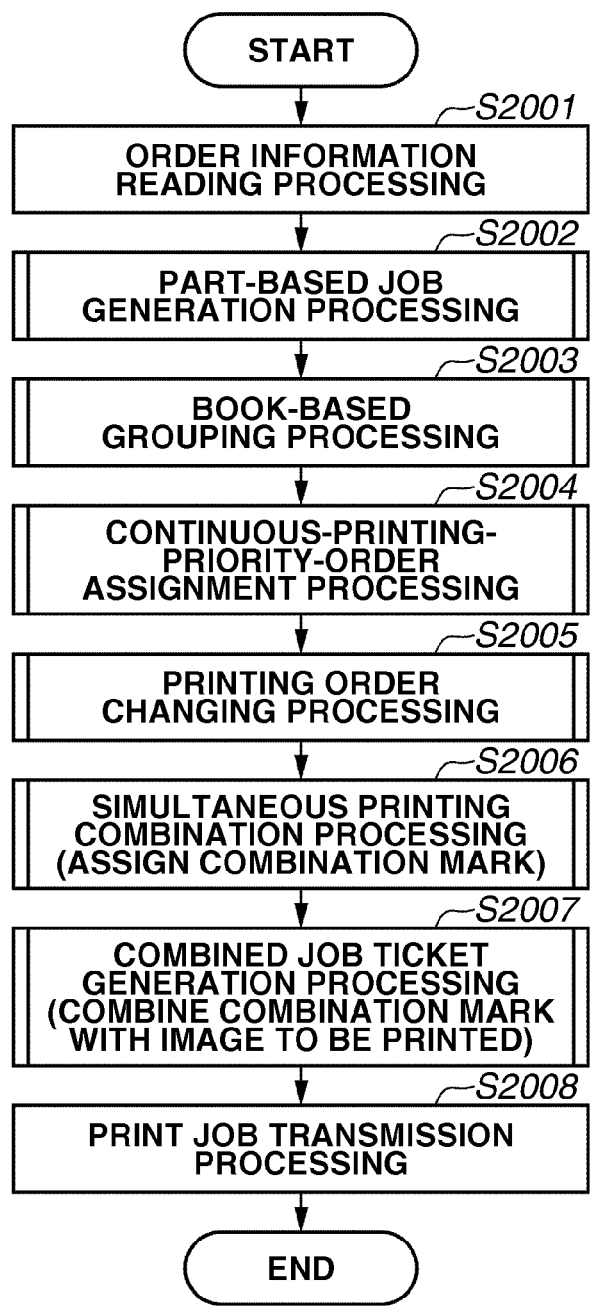

Each processing in the flow charts of the present exemplary embodiment is implemented by the CPU 135 of the printing control apparatus 101 loading and executing a program for performing processing in each step illustrated in the flow charts from the storage device 139 on the memory unit 136. Each processing in the flow chart of FIG. 11B is implemented by the CPU 135 loading and executing a program for performing processing in each step illustrated in the flow chart of FIG. 11B from the storage device 139 on the memory unit 136.

Unless otherwise described, the printing control apparatus according to the present exemplary embodiment has a configuration of the printing control apparatus according to the second exemplary embodiment.

Processing from steps S2001 through S2005 is similar to the processing in steps S1201 through S1205 according to the first exemplary embodiment. Accordingly, the detailed description thereof will not be repeated here.

After the processing in step S2005, the processing advances to step S2006. In step S2006, the printing availability determination unit 205 determines whether the simultaneous printing availability for each part. In addition, in step S2006, the printing availability determination unit 205 extracts a combination of part jobs that can be simultaneously printed on the same sheet and assigns a combination mark to the extracted combination of part jobs. The combination mark is assigned to allow the operator to visually verify the combination of the parts. The simultaneous printing combination processing in step S2006 for assigning the combination mark will be described in detail later below.

As illustrated in FIG. 21B, when the combination mark is assigned, a flag, which indicates that the combination mark has been assigned, is set to an item "combination mark" included in the job list.

In step S2007, the job ticket management unit 208 generates a simultaneous printing combined job ticket (combined part job) based on the part jobs to be combined together in the simultaneous printing, which have been extracted by the processing in step S2006. In addition, in step S2007, the job ticket management unit 208 combines the combination mark with the image to be printed. The combined job ticket generation processing in step S2007 for combining the combination mark with the image to be printed will be described in detail later below.

In step S2008, the job transmission unit 213 outputs the combined part jobs to the printing apparatus 214, such as an MFP, or the post-processing apparatus 215, such as a bookbinding machine or a cutting machine, according to the processing order described in the job list 211.

The simultaneous printing combination processing in step S2006, which is processing for extracting a combination of part jobs that can be simultaneously printed on the same sheet will be described in detail below with reference to the flow chart of FIG. 12B. Each processing in the flow chart of FIG. 12B is implemented by the CPU 135 loading and executing a program for performing processing in each step illustrated in the flow chart of FIG. 12B from the storage device 139 on the memory unit 136.

Processing from steps S2101 through S2110 is similar to the processing in steps S1301 through S1310 according to the second exemplary embodiment. Accordingly, the detailed description thereof will not be repeated here.

After the processing in step S2110, the processing advances to step S2111. In step S2111, the printing availability determination unit 205 assigns a combination mark, with which a group of the parts can be visually verified, to each of the combinations of the part jobs that can be simultaneously printed. The combination mark is to be applied by executing job list updating processing in the following step S2117 to the job list as a "combination mark" as illustrated in FIG. 22C.

The job list illustrated in FIG. 22C includes the contents of the order information 207 similar to job lists illustrated in FIGS. 19A through 19E.

Processing from steps S2112 through S2117 is similar to the processing in steps S1311 through S1316 according to the second exemplary embodiment illustrated in FIG. 12A. Accordingly, the detailed description thereof will not be repeated here.

The combined job ticket generation processing in step S2007 illustrated in the flow chart of FIG. 14B will be described in detail below. The combined job ticket generation processing is processing for generating a combined job ticket (combined part job) based on the part jobs that are combined and printed by the simultaneous printing.

Each processing in the flow chart of FIG. 14B is implemented by the CPU 135 loading and executing a program for performing processing in each step illustrated in the flowchart of FIG. 14B from the storage device 139 on the memory unit 136. Processing from steps S2201 and S2202 is similar to the processing in steps S1501 and S1502 according to the first exemplary embodiment. Accordingly, the detailed description thereof will not be repeated here.

After the processing in step S2202, the processing advances to step S2203. In step S2203, the job ticket management unit 208 combines a combination mark image with a combined imposition image. Processing from steps S2204 through S2206 is similar to the processing in steps S1503 through S1505 according to the first exemplary embodiment. Accordingly, the detailed description thereof will not be repeated here.

After the processing in step S2206, the processing advances to step S2207. In step S2207, the job list management unit 210 applies the generated combined job ticket (combined part job), the assigned combined job ID, and the combination mark to the job list 211. After the job list is updated, the job list illustrated in FIG. 22C is obtained. In addition, after the job list is updated in the above-described manner, the combination of the part jobs that can be simultaneously printed is substituted with the combined part job. Even after the combined part job is applied to the job list, the printing order for printing the other part jobs is not changed.

As described above, in simultaneous printing a plurality of pieces of content data composed on the same sheet, the present exemplary embodiment prints a combination mark, with which the combination of the parts can be visually verified, at the same time. Accordingly, the present exemplary embodiment can effectively prevent a possible operation failure of mistaken rearrangement of the printing order before the cutting processing.

The present exemplary embodiment, in which the combination mark is printed on the sheet used in the simultaneous printing, can be combined with the third exemplary embodiment described above, in which the processing order is rearranged with a consideration on the distribution job groups.

In each of the exemplary embodiments described above, the order of printing the print jobs for generating a photo book constituted by the parts is controlled. However, the present invention is not limited to this. More specifically, alternatively, the present invention can be implemented by controlling the printing order for executing the print jobs for generating a product bound into a book different from a photo book. More specifically, a document constituted by chapters can be generated by the present invention.

The present invention can also be achieved by providing a system or an apparatus with a storage medium storing program code of software implementing the functions of the embodiments and by reading and executing the program code stored in the storage medium with a computer of the system or the apparatus (a CPU or an micro processing unit (MPU)).

In this case, the program code itself, which is read from the storage medium, implements the functions of the embodiments described above, and accordingly, the storage medium storing the program code constitutes the present invention.

As the storage medium for supplying such program code, a flexible disk, a hard disk, an optical disk, a magneto-optical disk, a compact disc-read only memory (CD-ROM), a CD-recordable (CD-R), a nonvolatile memory card, and a ROM, can be used.

In addition, the functions according to the embodiments described above can be implemented not only by executing the program code read by the computer, but also implemented by the processing in which an OS (operating system) or the like carries out a part of or the whole of the actual processing based on an instruction given by the program code.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In an example, a computer-readable medium may store a program that causes a printing control apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-002088 filed Jan. 7, 2011, which is hereby incorporated by reference herein in its entirety.

What is claimed is:

1. A print control apparatus configured to control orders of print processings of plural print jobs, wherein each of the plural print jobs is grouped into any of groups by a predetermined category that defines the groups where printed materials obtained by executions of print processings of print jobs grouped in the same group are processed together in a post-print processing, the print control apparatus comprising:
   a detection unit configured to detect a first print job and a second print job in the plural print jobs; and
   a control unit configured to control orders of print processings of the detected first and second print jobs so that the print processing of the second print job is executed successive to the print processing of the first print job,
   wherein, in conjunction with the control of the order of the print processings of the detected first and second print jobs, the control unit further controls orders of print processings of a third print job and a fourth print job in the plural print jobs so that the print processing of the fourth print job is executed successive to the print processing of the third print job,
   wherein the first and third print jobs are grouped into a first group by the predetermined category, and
   wherein the second and fourth print jobs are grouped into a second group by the predetermined category.

2. The print control apparatus according to claim 1, wherein the detection unit detects the first print job and the second print job by determining whether features of the first print job and the second print job are the same with regard to paper used for a print processing of a print job.

3. The print control apparatus according to claim 1, wherein the predetermined category corresponds to a book product.

4. The print control apparatus according to claim 3, wherein the first print job and the second print job correspond to a first part of each book product, and the third print job and the fourth print job correspond to a second part of each book product.

5. The print control apparatus according to claim 4, wherein the first part of a book product is one of a wrapper band, a dust jacket, a cover, and a body, and the second part of a book product is another one of a wrapper band, a dust jacket, a cover, and a body.

6. A print control method for a print control apparatus configured to control orders of print processings of plural print jobs, wherein each of the plural print jobs is grouped into any of groups by a predetermined category that defines the groups where printed materials obtained by executions of print processings of print jobs grouped in the same group are processed together in a post-print processing, the print control method comprising:
   detecting a first print job and a second print job in the plural print jobs; and
   controlling orders of print processings of the detected first and second print jobs so that the print processing of the second print job is executed successive to the print processing of the first print job,
   wherein, in conjunction with the control of the order of the print processings of the detected first and second print jobs, controlling includes controlling orders of print processings of a third print job and a fourth print job in the plural print jobs so that the print processing of the fourth print job is executed successive to the print processing of the third print job,
   wherein the first and third print jobs are grouped into a first group by the predetermined category, and
   wherein the second and fourth print jobs are grouped into a second group by the predetermined category.

7. A non-transitory computer readable medium storing a program which causes a print control apparatus to perform a print control method, wherein the print control apparatus is configured to control orders of print processings of plural print jobs, wherein each of the plural print jobs is grouped into any of groups by a predetermined category that defines the groups where printed materials obtained by executions of print processings of print jobs grouped in the same group are processed together in a post-print processing, the print control method comprising:
- detecting a first print job and a second print job in the plural print jobs; and
- controlling orders of print processings of the detected first and second print jobs so that the print processing of the second print job is executed successive to the print processing of the first print job,
- wherein, in conjunction with the control of the order of the print processings of the detected first and second print jobs, controlling includes controlling orders of print processings of a third print job and a fourth print job in the plural print jobs so that the print processing of the fourth print job is executed successive to the print processing of the third print job,
- wherein the first and third print jobs are grouped into a first group by the predetermined category, and
- wherein the second and fourth print jobs are grouped into a second group by the predetermined category.

* * * * *